United States Patent
Awazu et al.

(10) Patent No.: US 10,884,214 B2
(45) Date of Patent: Jan. 5, 2021

(54) BINOCLE AND OPERATION SWITCH THEREOF HAVING OPERATION MEMBER AND SWITCH MAIN BODY

(71) Applicant: FUJIFILM Corporation, Tokyo (JP)

(72) Inventors: Kouhei Awazu, Saitama (JP); Akimasa Kaya, Saitama (JP)

(73) Assignee: FUJIFILM Corporation, Tokyo (JP)

(*) Notice: Subject to any disclaimer, the term of this patent is extended or adjusted under 35 U.S.C. 154(b) by 336 days.

(21) Appl. No.: 16/111,543

(22) Filed: Aug. 24, 2018

(65) Prior Publication Data

US 2018/0364443 A1 Dec. 20, 2018

Related U.S. Application Data

(63) Continuation of application No. PCT/JP2016/086994, filed on Dec. 13, 2016.

(30) Foreign Application Priority Data

Feb. 26, 2016 (JP) ................. 2016-035894

(51) Int. Cl.
*G02B 7/06* (2006.01)
*G02B 23/18* (2006.01)
(Continued)

(52) U.S. Cl.
CPC .............. *G02B 7/06* (2013.01); *G02B 23/18* (2013.01); *G02B 27/646* (2013.01); *G02B 25/004* (2013.01)

(58) Field of Classification Search
CPC ........ G02B 7/06; G02B 23/18; G02B 25/004; G02B 27/646
(Continued)

(56) References Cited

U.S. PATENT DOCUMENTS

| 4,066,329 | A  | * | 1/1978 | Van Exel | ............... | G02B 7/06 359/414 |
| 2006/0056075 | A1 | * | 3/2006 | Betensky | ............... | G02B 7/06 359/800 |
| 2017/0075131 | A1 |   | 3/2017 | Kaya | | |

FOREIGN PATENT DOCUMENTS

| JP | 54-105540 U | 7/1979 |
| JP | 10-333200 A | 12/1998 |
| WO | WO 2016/006569 A1 | 1/2016 |

OTHER PUBLICATIONS

International Preliminary Report on Patentability and Written Opinion of the International Searching Authority (forms PCT/IB/373, PCT/ISA/237 and PCT/IB/326), dated Sep. 7, 2018, for International Application No. PCT/JP2016/086994, with an English translation of the Written Opinion.

(Continued)

*Primary Examiner* — Ryan S Dunning
(74) *Attorney, Agent, or Firm* — Birch, Stewart, Kolash & Birch, LLP

(57) ABSTRACT

An operation dial is disposed so as to swing between two barrels. The operation dial has a plurality of finger gripping portions that protrudes so as to be inclined with respect to the two barrels. The operation dial is urged by a torsion coil spring to a state in which the two finger gripping portions have the same tilt angle with respect to the two barrels. A reception member is pushed by rotation of the operation dial in one direction and rotation of the operation dial in the other direction due to a swing operation for the finger gripping portions. A switch main body is opened or closed by the pushing of the reception member.

11 Claims, 26 Drawing Sheets

(51) Int. Cl.
*G02B 27/64* (2006.01)
*G02B 25/00* (2006.01)

(58) Field of Classification Search
USPC .......................... 359/407, 410, 480, 481, 482
See application file for complete search history.

(56) References Cited

OTHER PUBLICATIONS

International Search Report (form PCT/ISA/210), dated Mar. 21, 2017, for International Application No. PCT/JP2016/086994, with an English translation.

* cited by examiner

BINOCLE AND OPERATION SWITCH THEREOF HAVING OPERATION MEMBER AND SWITCH MAIN BODY

CROSS-REFERENCE TO RELATED APPLICATIONS

This application is a Continuation of PCT International Application No. PCT/JP2016/086994 filed on 13 Dec. 2016, which claims priority under 35 U.S.C § 119(a) to Japanese Patent Application No. 2016-035894 filed on 26 Feb. 2016. The above application is hereby expressly incorporated by reference, in its entirety, into the present application.

BACKGROUND OF THE INVENTION

1. Field of the Invention

The present invention relates to a binocle and an operation switch thereof.

2. Description of the Related Art

As an optical observation device for observing an optical image of a distant view in an enlarged manner, there are binocles each having a pair of telephoto optical systems disposed in a left-right direction. Further, in order to prevent image blurring of an optical image from being caused by vibration such as hand shaking, optical observation devices each comprising an anti-vibration device that corrects image blurring of the optical image have been known.

The anti-vibration device performs anti-vibration by moving an optical member in a direction in which the image blurring is suppressed, and a drive member such as a voice coil motor is used. In a case where an anti-vibration operation is actuated, an actuation switch is turned on. For example, in the binocle described in JP1998-333200A (JP-H10-333200A), a locking member is provided, and the locking member is moved between a locking position in which the actuation of image-blurring prevention means is locked and an unlocking position in which the actuation thereof is unlocked. An actuation switch of the image-blurring prevention means is switched between ON and OFF by the movement of the locking member.

SUMMARY OF THE INVENTION

In a binocle provided with an anti-vibration device, in a case where an anti-vibration switch is operated, it is preferable that the anti-vibration switch is disposed in the center of the binocle such that a finger reaches the anti-vibration switch in order for either of a right-hander and a left-hander to operate the anti-vibration switch. For example, in the binocle described in JP1998-333200A, the anti-vibration switch is disposed in the central portion of the binocle.

However, even though the anti-vibration switch is disposed in the center of the binocle, in a case where the anti-vibration switch is an operation switch that is simply pushed, it is necessary to perform a pushing operation by stretching the finger, and thus, there is a problem that the anti-vibration switch is not able to be simply turned on.

In order to solve the problem, an object of the present invention is to provide a binocle and an operation switch thereof which are capable of being easily operated by gripping of any of left and right hands.

In order to achieve the object, a binocle of the present invention comprises two barrels, an operation member, a plurality of finger gripping portions, an urging member, a reception member, and a switch main body. The operation member is disposed so as to swing between the two barrels. The finger gripping portions protrude toward the two barrels from the operation member. The urging member urges the operation member to a state in which at least two finger gripping portions have the same tilt angle with respect to the two barrels. The reception member is pushed by rotation of the operation member in one direction and rotation of the operation member in the other direction due to a swing operation for the finger gripping portions against the urging of the urging member. The switch main body is opened or closed by the pushing of the reception member.

It is preferable that the reception member has a first reception surface and a second reception surface, and the switch main body enters a closed state from an opened state due to the pushing for the first reception surface and the second reception surface. The first reception surface is pushed due to rotation displacement of the operation member in the one direction. The second reception surface is pushed due to rotation displacement of the operation member in the other direction.

It is preferable that the binocle further comprises a swing lever that is disposed between the operation member and the reception member and the swing lever engages with the operation member and swings. The swing lever includes a first abutment portion and a second abutment portion. The first abutment portion pushes the first reception surface due to the rotation displacement of the operation member in the one direction. The second abutment portion pushes the second reception surface due to the rotation displacement of the operation member in the other direction.

It is preferable that the binocle further comprises an intermediate lever that is disposed between the operation member and the swing lever and one end of the intermediate lever is held by the operation member, and the other end engages with the swing lever.

It is preferable that the operation member is rotatably attached to a focus adjusting shaft that rotates for adjusting a focus of the barrel.

It is preferable that the binocle comprises an anti-vibration device and an anti-vibration regulating member. The anti-vibration device corrects image blurring of an optical image by displacing at least a part of optical members within the barrel. The anti-vibration regulating member is displaced between an anti-vibration regulating position in which movement of the anti-vibration member is regulated by coming in contact with an anti-vibration member of the anti-vibration device and an anti-vibration position in which the movement of the anti-vibration member is allowed by being separated from the anti-vibration member. A position of the anti-vibration regulating member is switched between a state of the anti-vibration regulating position and a state of the anti-vibration position by being interlocked with the opening or closing of the switch main body, and anti-vibration control is performed.

It is preferable that the reception member has a first engagement portion and the anti-vibration regulating member has a second engagement portion that engages with the first engagement portion. The anti-vibration regulating member is positioned in the anti-vibration regulating position in a neutral state in which the reception member opens the switch and the anti-vibration regulating member is positioned in the anti-vibration position in a pushed state in which the reception member closes the switch due to the engagement of the first engagement portion with the second engagement portion.

It is preferable that the anti-vibration member has a first link member that corrects image blurring in a yaw direction and a second link member that corrects image blurring in a pitch direction. The anti-vibration regulating member has a first regulating member, and a second regulating member. The first regulating member regulates movement of the first link member by being engaged with a first engagement hole of the first link member in the state of the anti-vibration position. The second regulating member regulates movement of the second link member by being engaged with a second engagement hole of the second link member in the state of the anti-vibration position.

It is preferable that the anti-vibration device includes a first reflective member, a second reflective member, and holding members. The first reflective member is disposed to be inclined with respect to first optical axes and forms second optical axes by deflecting the first optical axes. The second reflective member is disposed to be inclined with respect to the second optical axes and forms third optical axes parallel to the first optical axes by deflecting the second optical axes. The holding members hold the first reflective member and the second reflective member, and are disposed so as to be rotatable around first rotational axes which are present on a plane including the first optical axes and the second optical axes and cross the first optical axes or the third optical axes. The holding members fixedly hold one reflective member of the first reflective member and the second reflective member, and rotatably hold the other reflective member around second rotational axes perpendicular to the plane including the first optical axes and the second optical axes. The first link member rotates a pair of the holding members around the first rotational axes in a state in which the first optical axes are held in parallel. The second link member is attached to the first link member so as to be rotatable around the third rotational axes parallel to the second rotational axes, and rotates the other reflective member of the first reflective member and the second reflective member around the second rotational axes.

It is preferable that the binocle comprises a first voice coil motor and a second voice coil motor. The first voice coil motor moves the first link member in a first direction which is an arrangement direction of the holding members. The second voice coil motor rotates the second link member around the third rotational axes by moving the second link member in a second direction perpendicular to the first direction.

An operation switch of a binocle of the present invention comprises an operation member, a plurality of finger gripping portions, an urging member, a reception member, and a switch main body. The operation member is disposed so as to swing between two barrels of the binocle. The finger gripping portions protrude toward the two barrels from the operation member. The urging member urges the operation member to a state in which at least two finger gripping portions have the same tilt angle with respect to the two barrels. The reception member is pushed by rotation of the operation member in one direction and rotation of the operation member in the other direction due to a swing operation for the finger gripping portions against the urging of the urging member. The switch main body is opened or closed by the pushing of the reception member.

According to the present invention, it is possible to provide a binocle and an operation switch thereof which are capable of being easily operated by gripping of any of left and right hands.

DESCRIPTION OF THE PREFERRED EMBODIMENTS

First Embodiment

Figure 1:
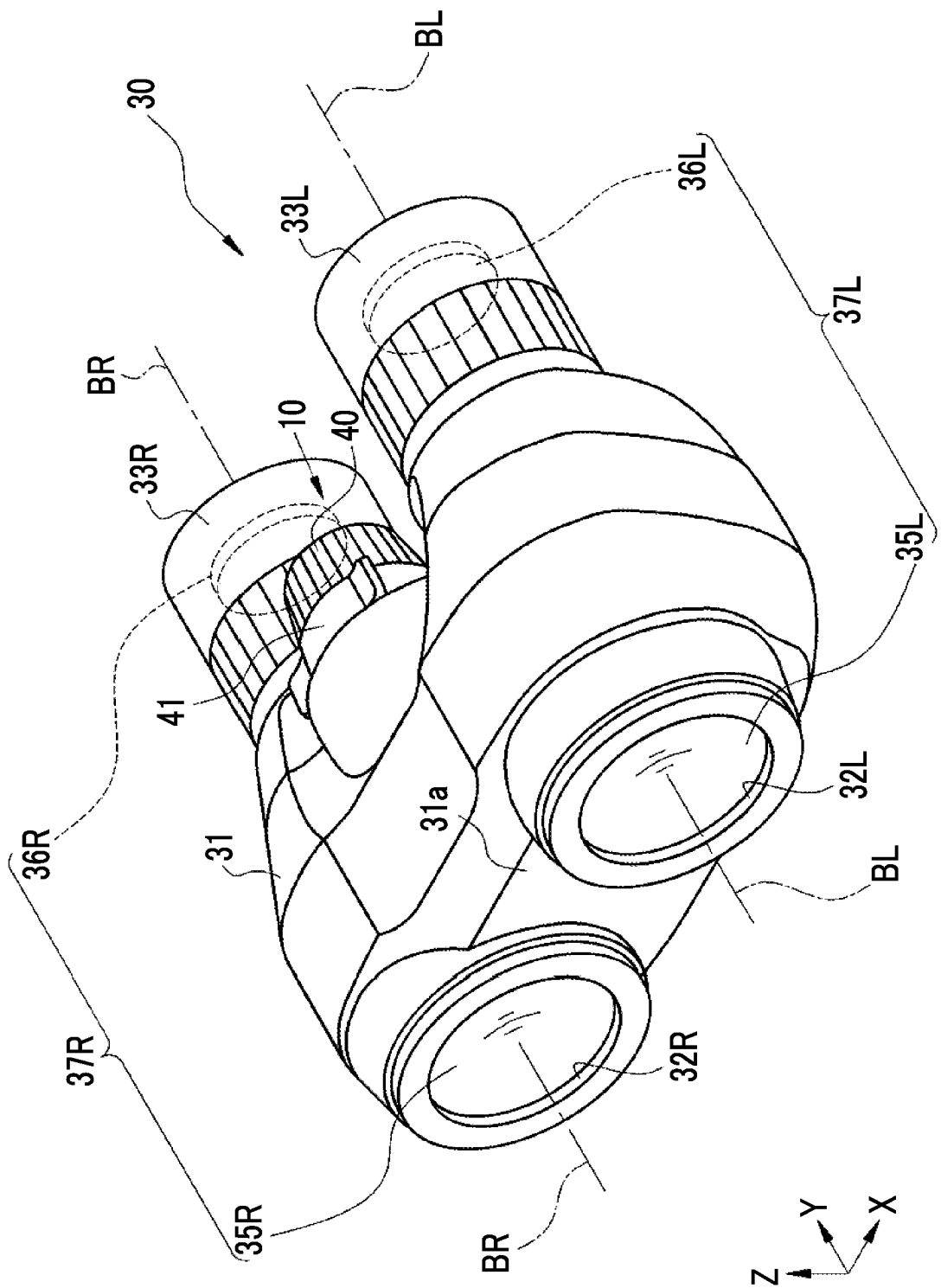
FIG. 1 is a perspective view illustrating an appearance of a binocle.

As shown in FIG. 1, a binocle 30 of the present embodiment is an optical observation device that is used to observe an optical image of a distant view in an enlarged manner through a pair of left telephoto optical system 37L and right telephoto optical system 37R which are constituted by telephoto optical systems. An anti-vibration device 45 (see FIG. 2) to be described below is provided on the binocle 30. Assuming that a front-back direction of the binocle 30 is a Y axis, a width direction orthogonal to the front-back direction is an X axis, and a vertical axis perpendicular to the Y axis and the X axis is a Z axis, the anti-vibration device 45 corrects image blurring in a pitch direction around the X axis and image blurring in a yaw direction around the Z axis.

The binocle 30 includes a main body portion 31, and a pair of left eyepiece portion 33L and right eyepiece portion 33R. A pair of left objective opening 32L and right objective opening 32R is provided on a front surface 31a of the main body portion 31. The left eyepiece portion 33L and the right eyepiece portion 33R are provided on a rear side of the main body portion 31. Through the binocle 30, an enlarged image of an observation target can be observed by orienting the left objective opening 32L and the right objective opening 32R toward the observation target and viewing the observation target through the left eyepiece portion 33L and the right eyepiece portion 33R with both eyes in a state where the main body portion 31 is gripped.

Inside the left objective opening 32L and the right objective opening 32R, a left objective optical system 35L and a right objective optical system 35R are provided. The left objective optical system 35L and the right objective optical system 35R are disposed such that a pair of left and right optical axes 64a (see FIG. 2) thereof is in parallel with each other.

Inside the left eyepiece portion 33L and the right eyepiece portion 33R, a left ocular optical system 36L and a right ocular optical system 36R are provided. The left objective optical system 35L, the right objective optical system 35R, the left ocular optical system 36L, and the right ocular optical system 36R each are formed of a lens having a positive composite focal length. In addition, for the sake of simplicity of drawings, the left objective optical system 35L, the right objective optical system 35R, the left ocular optical system 36L, and the right ocular optical system 36R each are shown as a single lens, but may be composed of a plurality of lenses.

The left objective optical system 35L and the left ocular optical system 36L are disposed on a left-eye optical axis BL which is set along the front-back direction (Y axis direction) of the binocle 30, and constitute the left telephoto optical system 37L. Further, the right objective optical system 35R and the right ocular optical system 36R are disposed on a right-eye optical axis BR which is set in parallel to the left-eye optical axis BL in the width direction (X axis direction) orthogonal to the front-back direction of the binocle 30, and constitute the right telephoto optical system 37R. Hereinafter, it is assumed that an objective side is referred to as a front side or a front end and an ocular side is referred to as a rear side or a rear end in the Y axis direction.

A battery housing 39 (see FIG. 2) is provided within the main body portion 31. The battery housing 39 houses a battery 42 (see FIG. 2) that serves as a power supply of a first voice coil motor 56, a second voice coil motor 57 (see FIGS. 2, 20, and 21), and an anti-vibration control circuit 91 (see FIG. 22) to be described below. The battery 42 has a square plate shape. Further, a focus adjusting knob 40, which is rotated in a case where focus adjustment is performed, is provided on an upper portion on the rear side of the main body portion 31. A rotation type power switch (operation switch) 10 (see FIG. 4) of the present invention is provided coaxially with the focus adjusting knob 40. The power switch 10 is rotated, and thus, the anti-vibration control circuit 91 is actuated.

Figure 2:
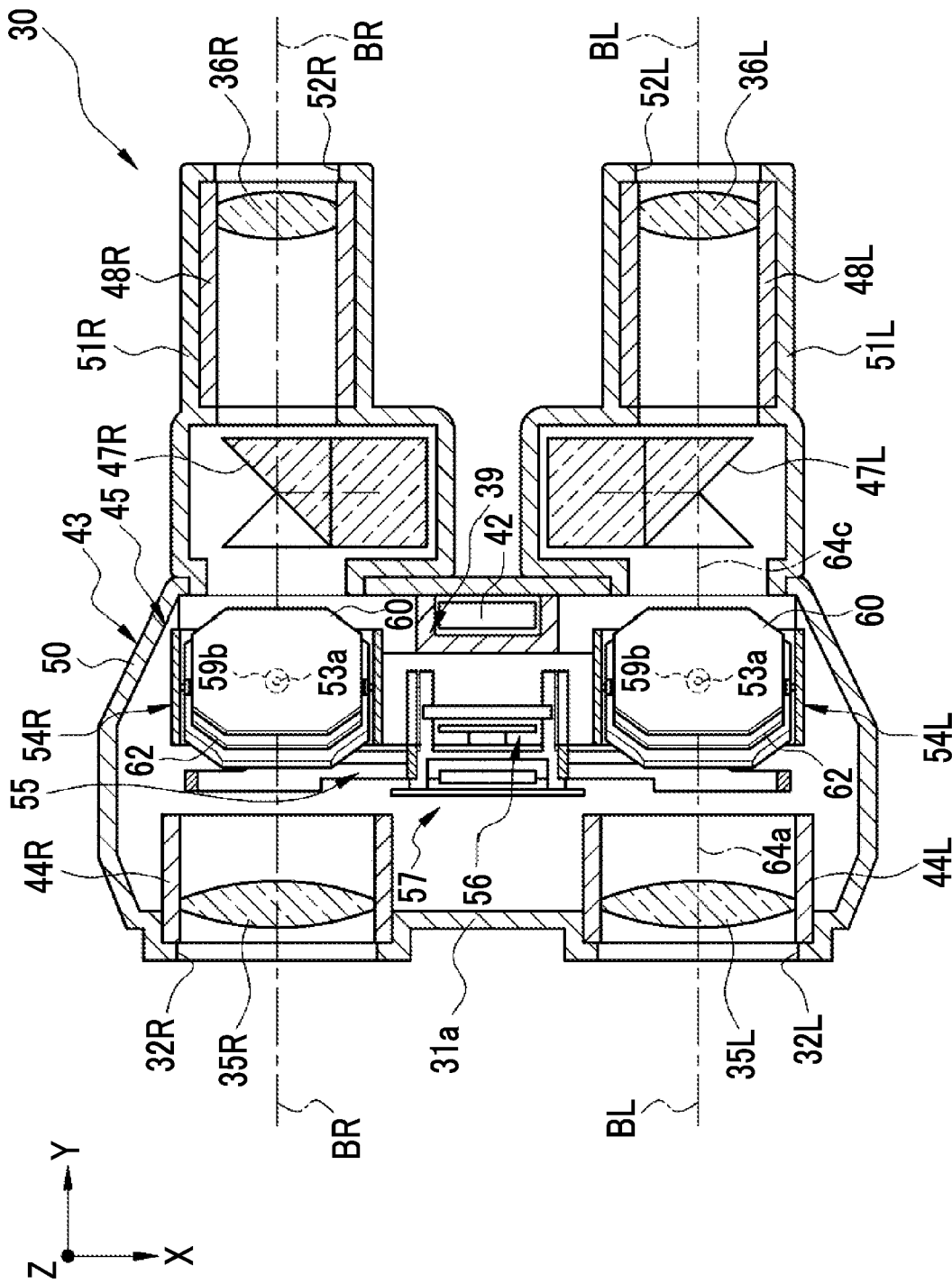
FIG. 2 is a horizontal cross-section view of the binocle.
Figure 3:
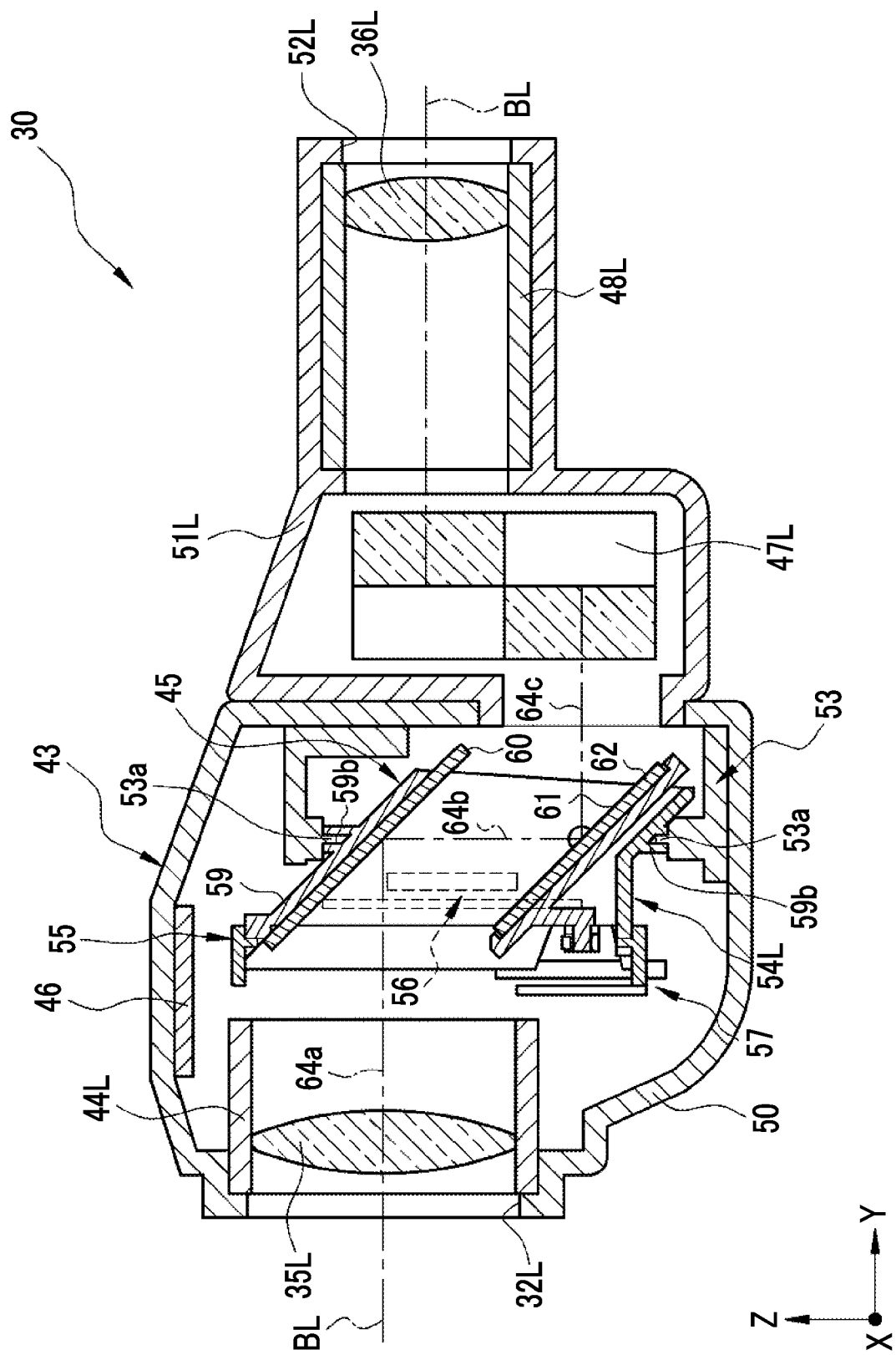
FIG. 3 is a vertical cross-section view taken along a left-eye optical axis of the binocle.

FIG. 2 shows a horizontal cross section of the binocle 30, and FIG. 3 shows a vertical cross section taken along the left-eye optical axis BL. As shown in FIGS. 2 and 3, the binocle 30 comprises a casing 43, a left objective barrel 44L, a right objective barrel 44R, an anti-vibration device 45, a control substrate 46, a left erecting optical system 47L, a right erecting optical system 47R, a left eyepiece barrel 48L, and a right eyepiece barrel 48R. The anti-vibration device 45 including the anti-vibration optical system and the left erecting optical system 47L are included in the left telephoto optical system 37L. The anti-vibration device 45 and the right erecting optical system 47R are included in the right telephoto optical system 37R.

The casing 43 comprises a casing main body 50, a left eyepiece casing 51L, and a right eyepiece casing 51R. The casing main body 50 is an exterior of the main body portion 31. The left eyepiece casing 51L is an exterior of the left eyepiece portion 33L. The right eyepiece casing 51R is an exterior of the right eyepiece portion 33R. The casing main body 50 houses the left objective barrel 44L, the right objective barrel 44R, the anti-vibration device 45, and the control substrate 46. The left eyepiece casing 51L houses the left erecting optical system 47L and the left eyepiece barrel 48L. Further, the right eyepiece casing 51R houses the right erecting optical system 47R and the right eyepiece barrel 48R. A support member 53 is fixed to the casing main body 50. The support member 53 vertically supports the anti-vibration device 45.

In the left eyepiece casing 51L and the right eyepiece casing 51R, a left eyepiece opening 52L and a right eyepiece opening 52R are respectively provided to expose the left ocular optical system 36L and the right ocular optical system 36R to the outside. The left eyepiece casing 51L and the right eyepiece casing 51R are fit so as to be rotatable respectively around a central axis along the Y axis direction of the casing main body 50. Accordingly, it is possible to adjust the widths of the left ocular optical system 36L and the right ocular optical system 36R in the X axis direction in accordance with spacing between both eyes of a binocle user.

The left objective barrel 44L and the right objective barrel 44R have cylinder shapes, and the left objective optical system 35L and the right objective optical system 35R are respectively housed therein. The left objective barrel 44L and the right objective barrel 44R are held movably in a direction of the optical axis 64a through a holding mechanism which is not shown. The holding mechanism moves the left objective barrel 44L and the right objective barrel 44R in the direction of the optical axis 64a through the rotation operation of the focus adjusting knob 40.

Figure 4:
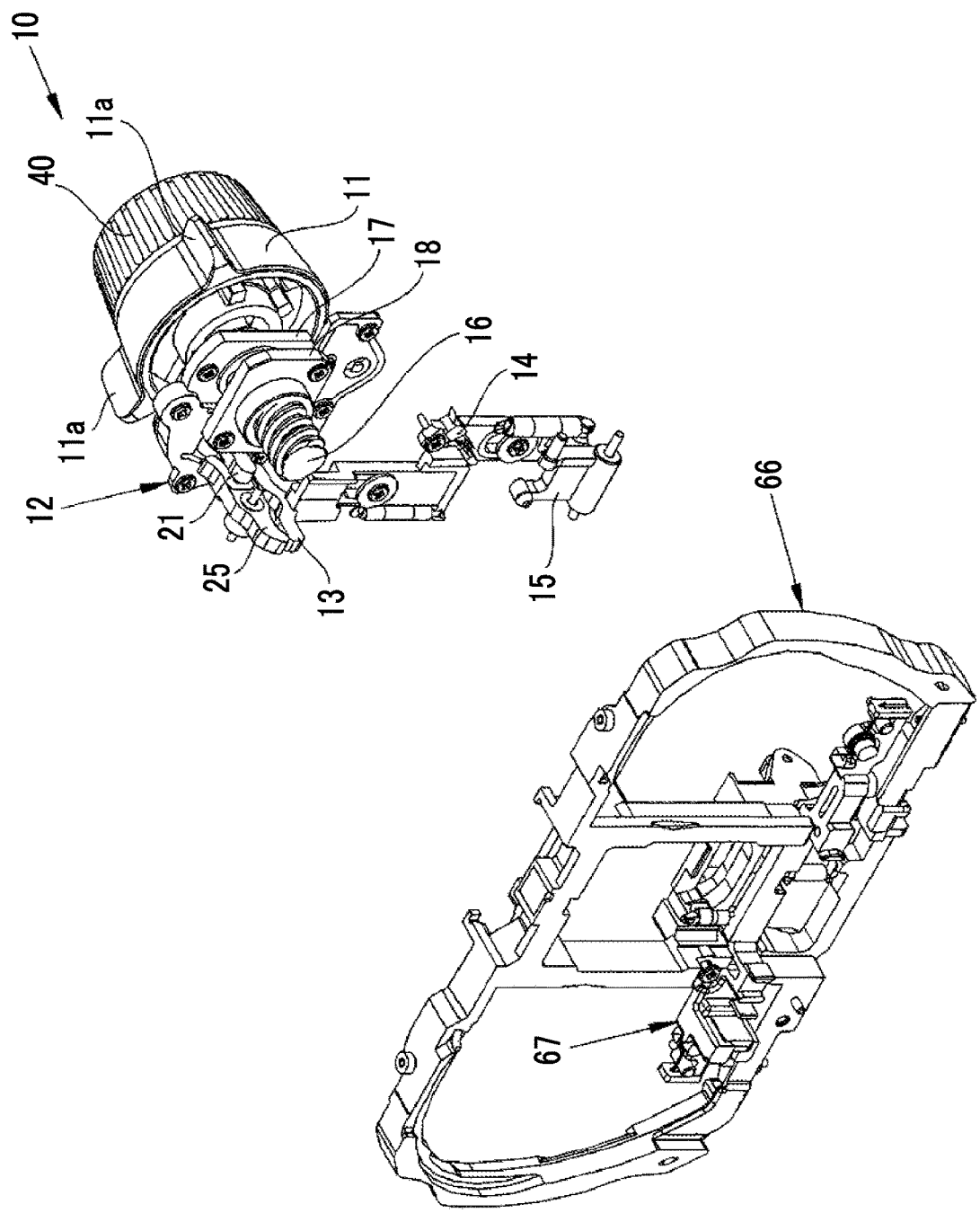
FIG. 4 is a perspective view showing the entire configuration of a power switch.

FIG. 4 is a perspective view showing the entire configuration of the power switch 10. The power switch 10 includes an operation dial 11 as an operation member, an interlocking mechanism 12, a reception member 13, a switch main body 14, and an anti-vibration regulating lever 15 as an anti-vibration regulating member.

Figure 5:
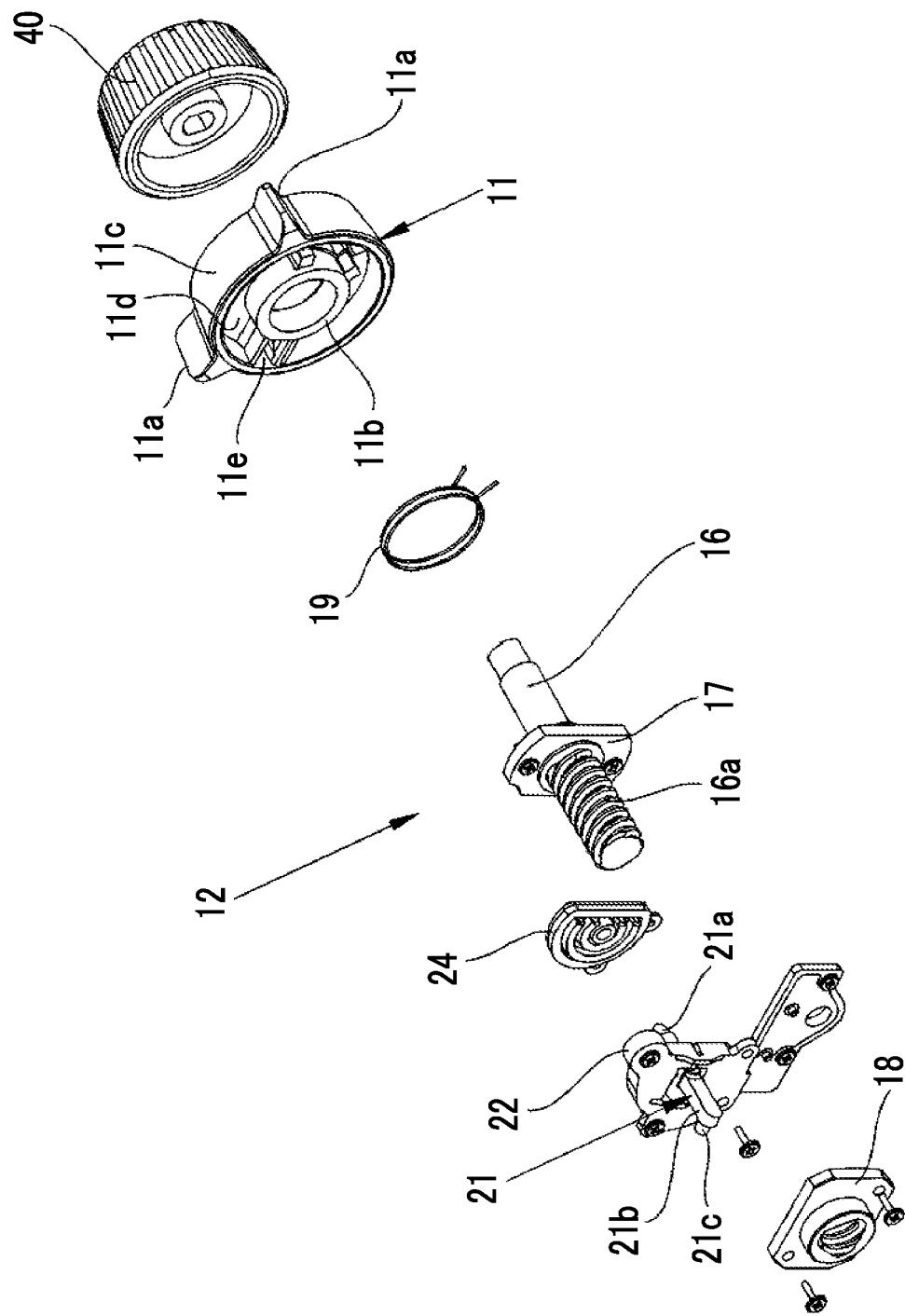
FIG. 5 is an exploded perspective view showing an operation dial and an interlocking mechanism.

As shown in FIG. 5, the operation dial 11 is rotatably attached to the focus adjusting shaft 16 having one end to which the focus adjusting knob 40 is fixed. The focus adjusting shaft 16 is rotatably attached to the support member 53 (see FIG. 8) by an attachment shaft portion 17. A male screw portion 16a is formed at the other end of the focus adjusting shaft 16, and a movement bracket 18 is screwed to the male screw portion 16a. The movement bracket 18 is attached so as not to be rotatable around a circumferential direction of the focus adjusting shaft 16, and so as to be movable in an axial direction of the focus adjusting shaft 16. The movement bracket 18 is linked to the left objective barrel 44L and the right objective barrel 44R (see FIG. 2). Accordingly, in a case where the focus adjusting shaft 16 is rotated through the rotation operation of the focus adjusting knob 40, the left objective barrel 44L and the right objective barrel 44R move in the optical axis direction through the movement bracket 18, and thus, the focus is adjusted.

Finger gripping portions 11a are formed so as to protrude from an outer circumferential surface of the operation dial 11. For example, the two finger gripping portions 11a are formed in an outer circumferential direction of the operation dial 11 at a distance of 120 degrees. The operation dial 11 is formed in a hollow double tubular shape in which an attachment tube 11b and an outer tube 11c are connected by a disk portion 11d.

The interlocking mechanism 12 is a mechanism that converts a rotation displacement into a push displacement of the reception member 13 through the rotation operation using the finger gripping portion 11a of the operation dial 11. The interlocking mechanism 12 includes a torsion coil spring 19, an intermediate lever 21, and a swing lever 25 (see FIG. 4).

The torsion coil spring 19 is attached to the outer circumferential surface of the attachment tube 11b of the operation dial 11. In a case where the fingers are gripped to the finger gripping portions 11a and the operation dial 11 swings, the torsion coil spring 19 urges the operation dial 11 so as to return the operation dial to a neutral position. The neutral position is a position in which the finger gripping portions 11a are in a point symmetry with respect to a vertical line passing through the central axis of the focus adjusting shaft 16. The finger gripping portions 11a have the same tilt angle with respect to the left objective barrel 44L and the right objective barrel 44R and the left eyepiece barrel 48L and the right eyepiece barrel 48R at the neutral position. The operation dial 11 is aligned in the neutral position, and thus, distal ends of index fingers or middle fingers of left and right hands are positioned in the finger gripping portions 11a while the binocle 30 is held by the right hand or left hand or both the hands.

A locking hole 11e is formed in the disk portion 11d between the attachment tube 11b and the outer tube 11c of the operation dial 11. One end portion 21a of the intermediate lever 21 is locked in the locking hole 11e. The intermediate lever 21 is attached so as to swing with the central portion as a fulcrum in a vertical direction by an intermediate lever holding member 22. A rubber holding bracket 24 is attached to a shaft portion of the intermediate lever 21 facing the locking hole 11e. The holding bracket 24 has a plurality of concentric grooves in a circumferential direction, and horizontally holds the intermediate lever 21 by using the elasticity thereof in a state in which the operation dial 11 is in the neutral position. An engagement pin 21c is formed at the other end portion 21b of the intermediate lever 21 so as to protrude in the horizontal direction. The engagement pin 21c engages with an engagement hole 25d in one end of the swing lever 25 shown in FIG. 6, and the swing lever 25 also swings through the swing of the intermediate lever 21.

Figure 6:
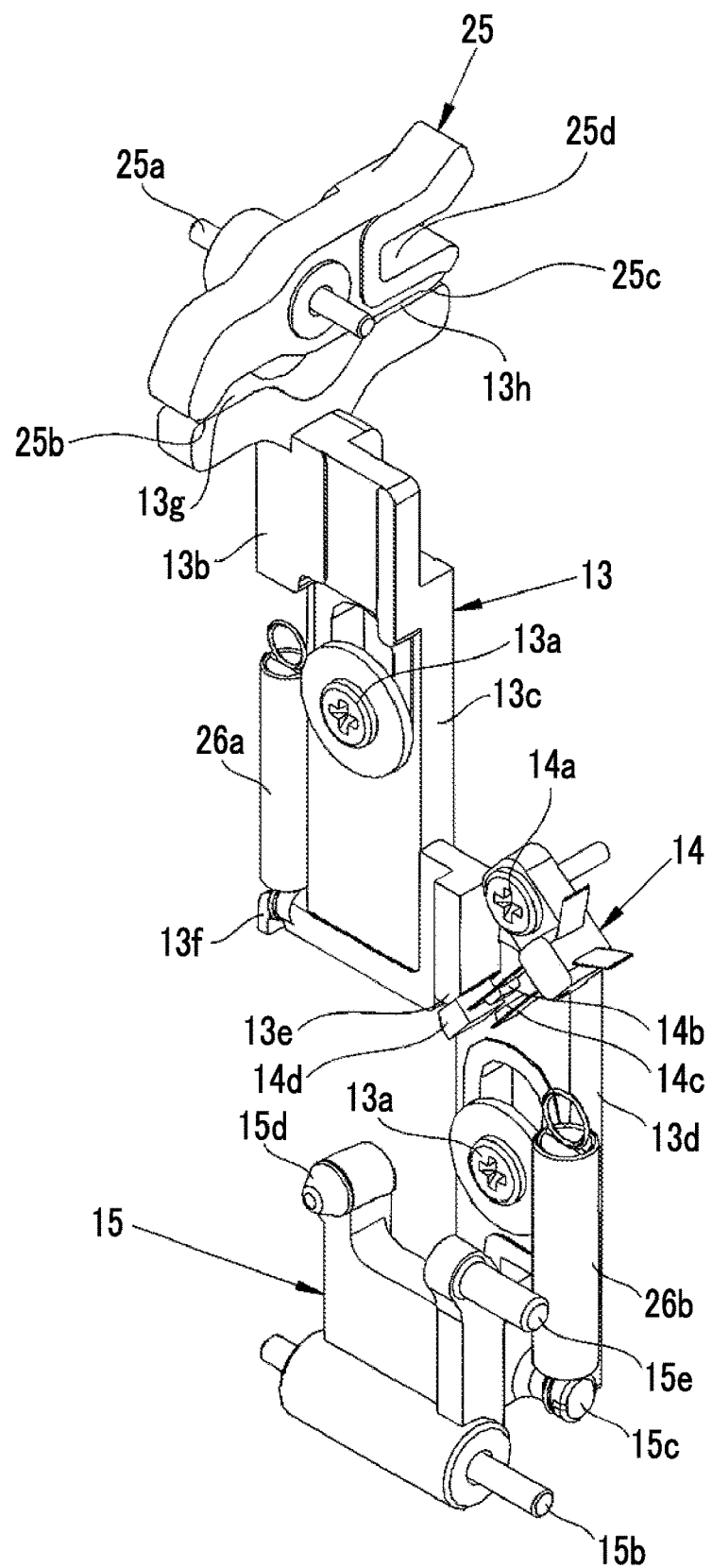
FIG. 6 is a perspective view showing a swing lever and a reception member in a neutral state.
Figure 7:
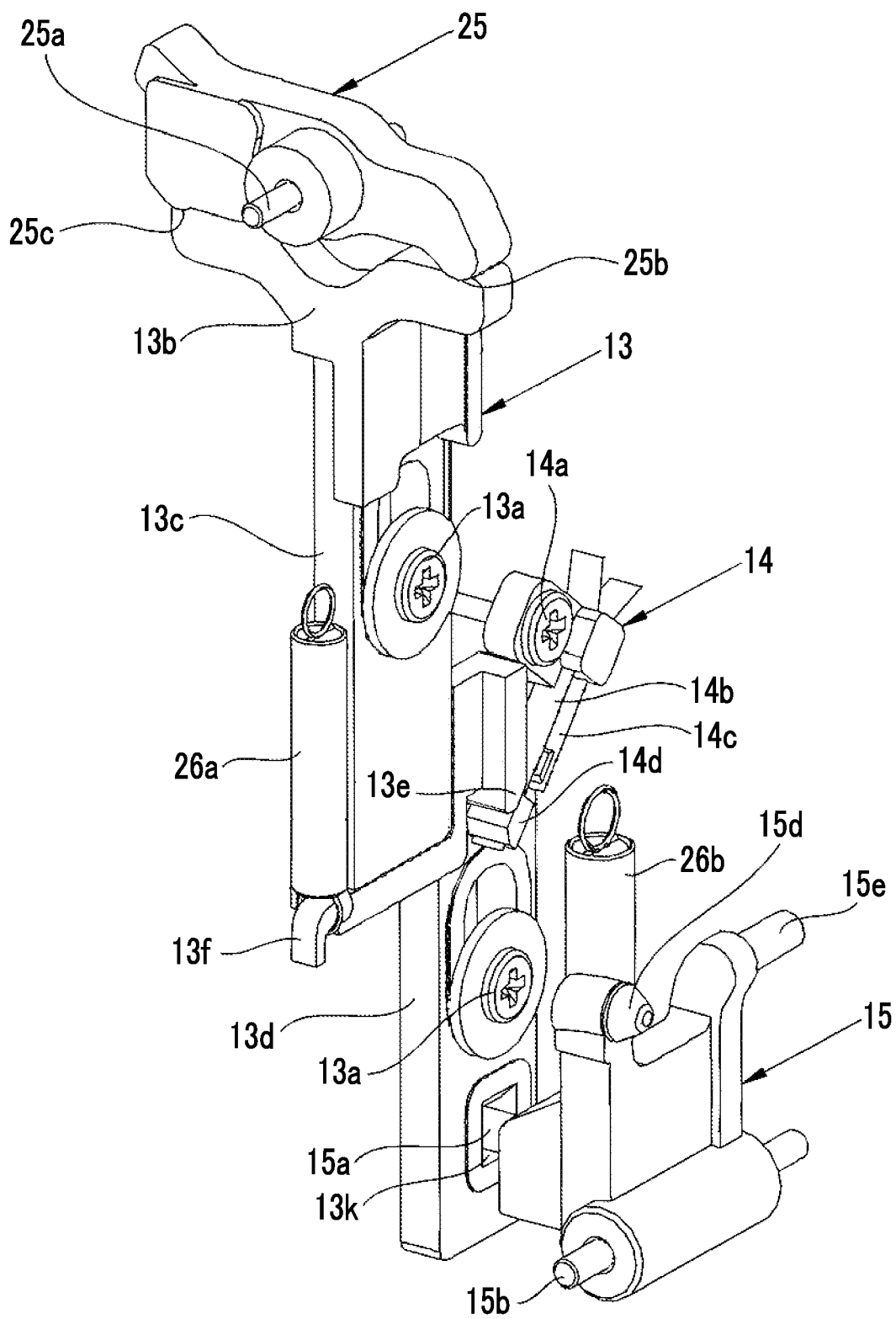
FIG. 7 is a perspective view of the swing lever and the reception member in the neutral state when viewed at an angle different from that in FIG. 6.

As shown in FIGS. 6 and 7, the swing lever 25 is rotatably supported by an attachment shaft 25a. As shown in FIG. 4, in a case where the operation dial 11 is in the neutral position, the swing lever 25 is in a horizontal state, and a first abutment portion 25b and a second abutment portion 25c are at the same horizontal level.

Figure 8:
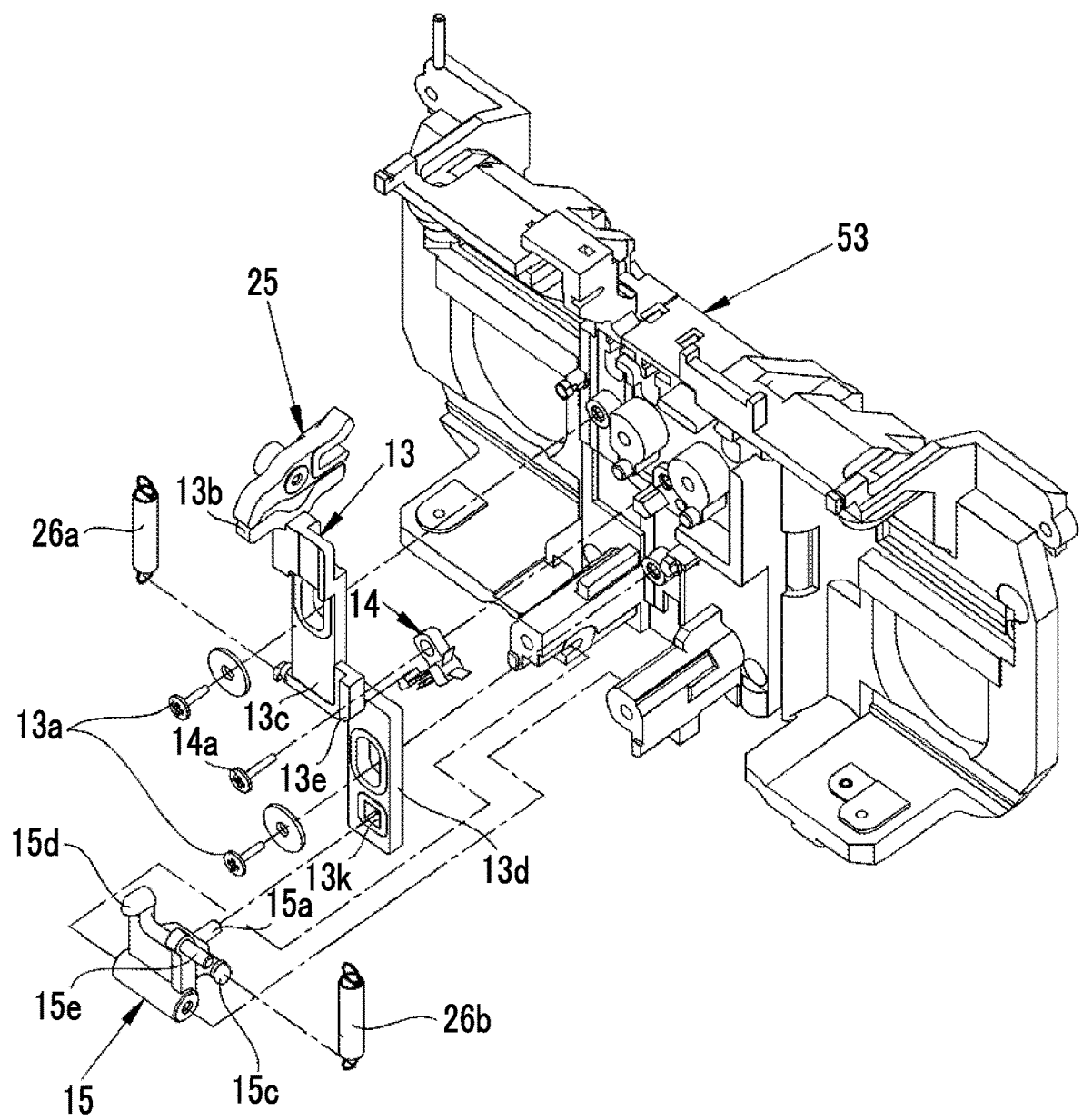
FIG. 8 is an exploded perspective view for describing the attachment of the reception member, a switch main body, and an anti-vibration regulating lever to a support member.

As shown in FIGS. 6 and 8, the reception member 13 comes in contact with the first abutment portion 25b and the second abutment portion 25c of the swing lever 25 is provided under the swing lever 25. The reception member 13 is elongated in the vertical direction, and is attached to the support member 53 through an attachment screw 13a so as to slide in the vertical direction. In the present embodiment, the reception member 13 is integrally formed by connecting a T-shaped reception portion 13b and two slider main bodies 13c and 13d in the vertical direction. A stepped portion 13e formed by deviating both the slider main bodies 13c and 13d in the horizontal direction is formed at a connecting portion of the two slider main bodies 13c and 13d.

A spring locking portion 13f is formed on a side portion of one of the slider main bodies 13c. One end of a first coil spring 26a is locked in the spring locking portion 13f. The other end of the first coil spring 26a is locked by the support member 53, and the reception member 13 is urged upwards by the first coil spring 26a in the vertical direction. The reception member 13 is held in a neutral state in which the reception member moves upwards through the urging. In this neutral state, the first abutment portion 25b of the swing lever 25 abuts on a first reception surface 13g of the reception portion 13b, and the second abutment portion 25c of the swing lever abuts on the second reception surface 13h.

The switch main body 14 is disposed near the stepped portion 13e. The switch main body 14 is fixed to the support member 53 by an attachment screw 14a. The switch main body 14 includes a first switch portion 14b and a second switch portion 14c of which lengths are different, and an engagement portion 14d. The first switch portion 14b and the second switch portion 14c are disposed so as to face each other. A block-shaped engagement portion 14d is attached to a distal end of the long first switch portion 14b. In the neutral state in which the abutment portions 25b and 25c of the swing lever 25 respectively abut on the first reception surface 13g and the second reception surface 13h of the reception portion 13b, the stepped portion 13e does not push the engagement portion 14d, and the switch main body 14 is opened.

Figure 9:
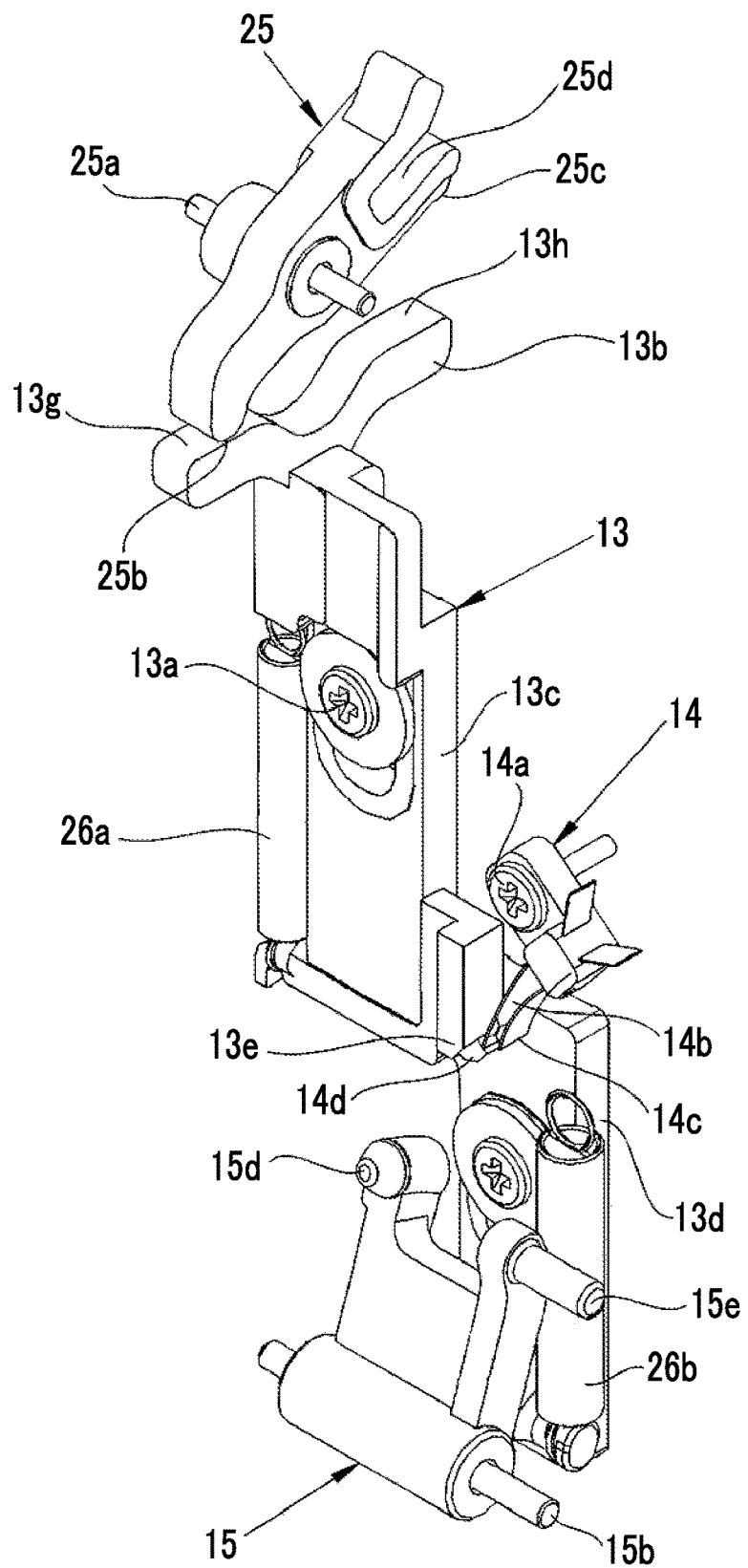
FIG. 9 is a perspective view showing the reception member, the switch main body, and the anti-vibration regulating lever in a pushed state.
Figure 10:
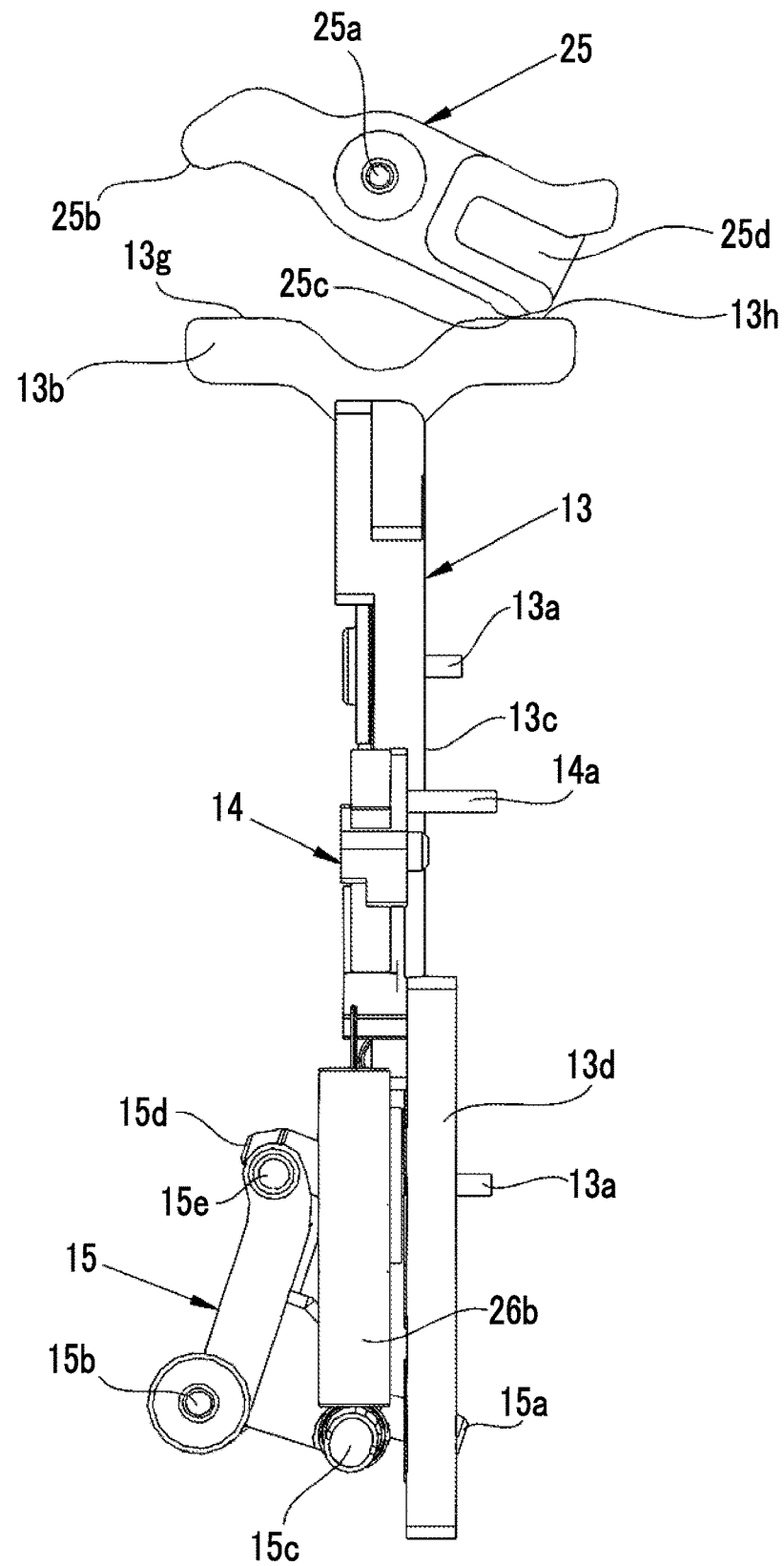
FIG. 10 is a side view showing the swing lever and the reception member in a state in which the operation dial is rotated in a direction different from that in FIG. 9.

As shown in FIG. 9, in a case where the swing lever 25 swings in a direction in which the swing lever lowers the first abutment portion 25b, the first abutment portion 25b pushes the first reception surface 13g of the reception member 13. Accordingly, the reception member 13 is displaced in a pushed position in which the reception member moves downwards from the neutral position. As shown in FIG. 10, in a case where the swing lever 25 swings in a direction in which swing lever lowers the second abutment portion 25c, the second abutment portion 25c pushes the second reception surface 13h of the reception member 13. Accordingly, the reception member 13 is displaced in a pushed position in which the reception member moves downwards from the neutral position.

The reception member 13 is displaced to the pushed position, and thus, the engagement portion 14d comes in contact with the stepped portion 13e. Accordingly, the first switch portion 14b is bent. The first and second switch portions 14b and 14c come in contact with each other through the bending, and the switch main body 14 is closed. In a case where the reception member is returned to the neutral position, the engagement portion 14d and the stepped portion 13e are separated from each other. Accordingly, since the switch portions 14b and 14c are elastically restored and both the switch portions are separated from each other, the switch main body 14 is opened.

As shown in FIGS. 7 and 8, an engagement hole 13k as a first engagement portion is formed in a lower end portion of the reception member 13. An engagement pin (second engagement portion) 15a of the anti-vibration regulating lever 15 is inserted into the engagement hole 13k in an assembled state. The anti-vibration regulating lever 15 is attached to the support member 53 so as to swing by an attachment shaft 15b extending in the horizontal direction. The spring locking portion 15c is formed so as to protrude from the anti-vibration regulating lever 15. One end of a second coil spring 26b is locked by the spring locking portion 15c. The other end of the second coil spring 26b is locked by the support member 53. The anti-vibration regulating lever 15 is urged by the second coil spring 26b so as to face in the vertical direction.

A first regulating pin 15d as a first regulating member and a second regulating pin 15e as a second regulating member protrude, and thus, the anti-vibration regulating lever 15 is formed. In a case where the reception member 13 is pushed downwards through the swing of the swing lever 25, the engagement pin 15a is pushed downward by the engagement hole 13k, and thus, the anti-vibration regulating lever 15 swings. Due to the swing, the anti-vibration regulating lever 15 is displaced between an anti-vibration regulating position in a locked state in which the anti-vibration regulating lever erects in the vertical direction as shown in FIGS. 6 and 7 and an anti-vibration position in a unlocked state in which the anti-vibration regulating lever swings and tilts as shown in FIGS. 9 and 10.

Figure 11:
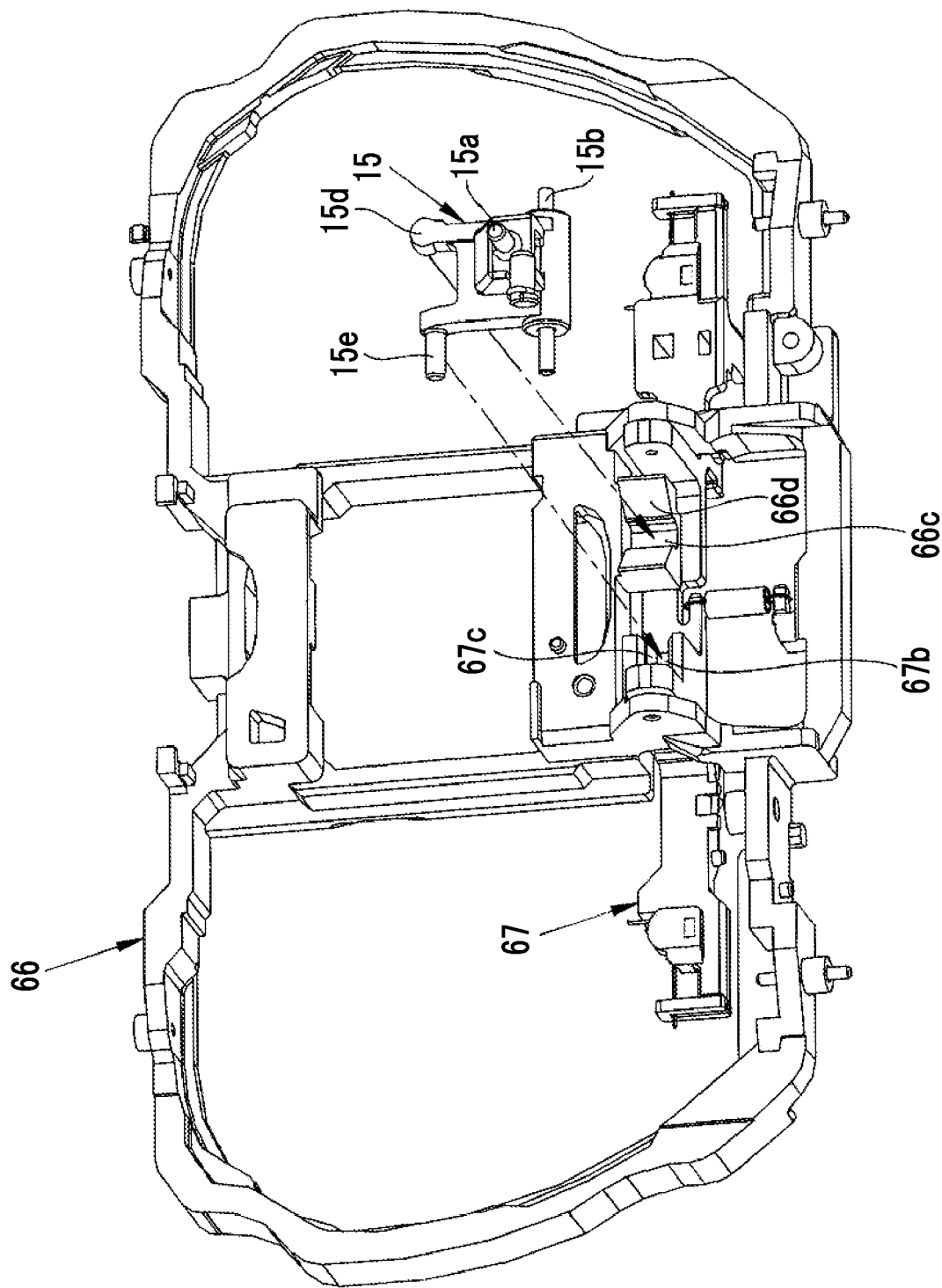
FIG. 11 is a perspective view showing an engagement hole of a link member with which each regulating pin of the anti-vibration regulating lever engages.

In the locked state shown in FIG. 7, the first regulating pin 15d of the anti-vibration regulating lever 15 is inserted into a first engagement hole 66c of a first link member 66 as an anti-vibration member shown in FIG. 11, and the movement of the first link member 66 in the horizontal direction (first direction) is regulated. In the locked state, the second regulating pin 15e of the anti-vibration regulating lever 15 is inserted into a second engagement hole 67b of a second link member 67 as an anti-vibration member, and the movement of the second link member 67 in the vertical direction (second direction) is regulated. The movement of the first link member 66 and the second link member 67 of the anti-vibration device 45 is regulated by the pins 15d and 15e.

In the unlocked state, the first regulating pin 15d is separated from the first engagement hole 66c, and the second regulating pin 15e is separated from the second engagement hole 67b. Thus, the movement regulation of each frame of the anti-vibration device 45 is canceled, and the first link member 66 and the second link member 67 can move.

In a pushed state in which the reception member 13 is pushed through the swing of the swing lever 25, the switch main body 14 is closed, and the anti-vibration control circuit 91 is turned on. In a case where the anti-vibration regulating lever 15 is positioned in the anti-vibration position from the anti-vibration regulating position, since the anti-vibration control circuit 91 is turned on, it is possible to perform anti-vibration control.

The first engagement hole 66c has a guide surface 66d that gradually expands in the horizontal direction. The second engagement hole 67b has a guide surface 67c that gradually expands in the vertical direction. The first regulating pin 15d has a guide surface of which a distal end has a tapered shape. The second regulating pin 15e has a cylindrical shape, and the outer circumferential surface thereof functions as the guide surface.

In a case where the rotation operation using the finger gripping portions 11a of the operation dial 11 is stopped and the fingers are separated from the finger gripping portions 11a or the fingers are relaxed, the operation dial 11 is returned to the neutral position. In a case where the operation dial 11 is returned to the neutral position, the pushing of the reception member 13 using the interlocking mechanism 12 is canceled. Since the reception member 13 is urged upwards by the first coil spring 26a, in a case where the pushing of the reception member 13 is stopped, the reception member 13 moves upwards, and is returned to the neutral position. The reception member 13 is returned to the neutral position, and thus, the anti-vibration regulating lever 15 interlocked through the engagement pin 15a and the engagement hole 13k is positioned in the anti-vibration regulating position in the locked state from the anti-vibration position in the unlocked state. In a case where the anti-vibration regulating lever is displaced to the anti-vibration regulating position, since the regulating pins 15d and 15e are guided by the guide surfaces 66d and 67c, the regulating pins 15d and 15e are smoothly and promptly inserted into the engagement holes 66c and 67b, and thus, the first link member 66 and the second link member 67 can be returned to the neutral position. Projection lengths of the guide surfaces 66d and 67c including the engagement holes 66c and 67b in the Y axis direction are equal to or greater than the movement strokes of the link members 66 and 67, and thus, the regulating pins 15d and 15e can be returned to the engagement holes 66c and 67b even in any position during the anti-vibration control. The reception member 13 moves upwards, and thus, the pushing for the engagement portion 14d using the stepped portion 13e is canceled. Thus, the switch main body 14 is opened.

Figure 12:
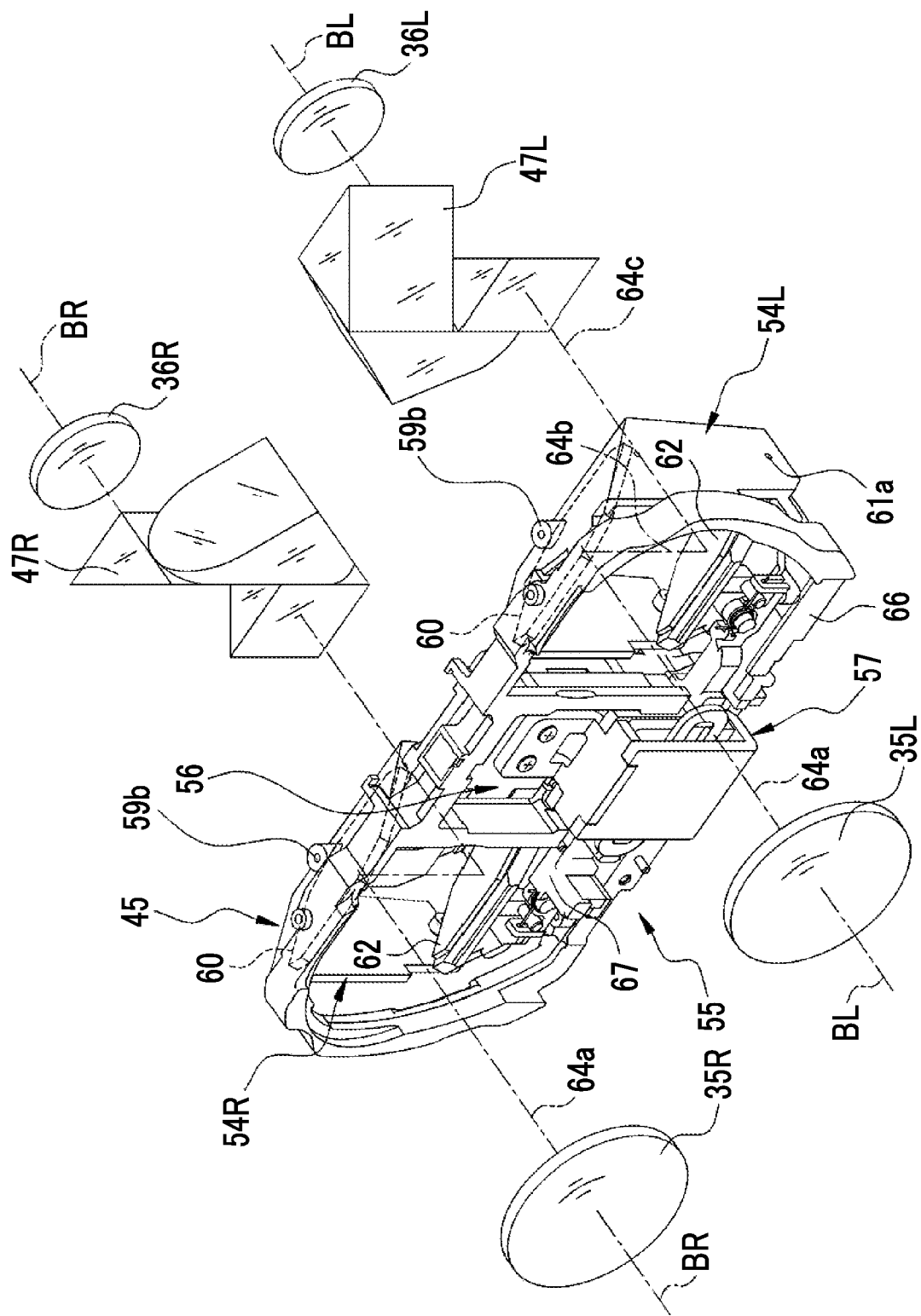
FIG. 12 is a perspective view illustrating a configuration of an anti-vibration device.

Next, the configuration of the anti-vibration device 45 will be described. The anti-vibration device 45 is a device for correcting image blurring, which is caused by hand shaking and the like, on an optical image. The anti-vibration device 45 is disposed between the left and right objective optical systems 35L and 35R and the left and right ocular optical systems 36L and 36R. As shown in FIG. 12, the anti-vibration device 45 comprises a left anti-vibration unit 54L, a right anti-vibration unit 54R, a link mechanism 55, the first voice coil motor 56, and the second voice coil motor 57.

The left anti-vibration unit 54L is a mechanism for correcting image blurring in the left telephoto optical system 37L. The left anti-vibration unit 54L is disposed between the left objective optical system 35L and the left ocular optical system 36L, and constitutes a part of the left telephoto optical system 37L. Further, the right anti-vibration unit 54R is a mechanism for correcting image blurring in the right telephoto optical system 37R. The right anti-vibration unit 54R is disposed between the right objective optical system 35R and the right ocular optical system 36R, and constitutes a part of the right telephoto optical system 37R.

The link mechanism 55 is a mechanism that links the left anti-vibration unit 54L and the right anti-vibration unit 54R with each other and that causes the left anti-vibration unit 54L and the right anti-vibration unit 54R to perform the same operations at the time of image blur correction. The first voice coil motor 56 and the second voice coil motor 57 are disposed between the left anti-vibration unit 54L and the right anti-vibration unit 54R, and cause the left anti-vibration unit 54L and the right anti-vibration unit 54R to perform the same operation by driving the link mechanism 55.

The left erecting optical system 47L and the right erecting optical system 47R are optical systems that invert the optical image, in which image blurring is corrected through the anti-vibration device 45, in vertical and horizontal directions, and that causes light to be incident into the left ocular optical system 36L and the right ocular optical system 36R. In each of the left erecting optical system 47L and the right erecting optical system 47R, an erecting prism such as a Porro prism or a roof prism is used.

The left eyepiece barrel 48L and the right eyepiece barrel 48R have cylinder shapes, and the left ocular optical system 36L and the right ocular optical system 36R are respectively housed therein.

Figure 13:
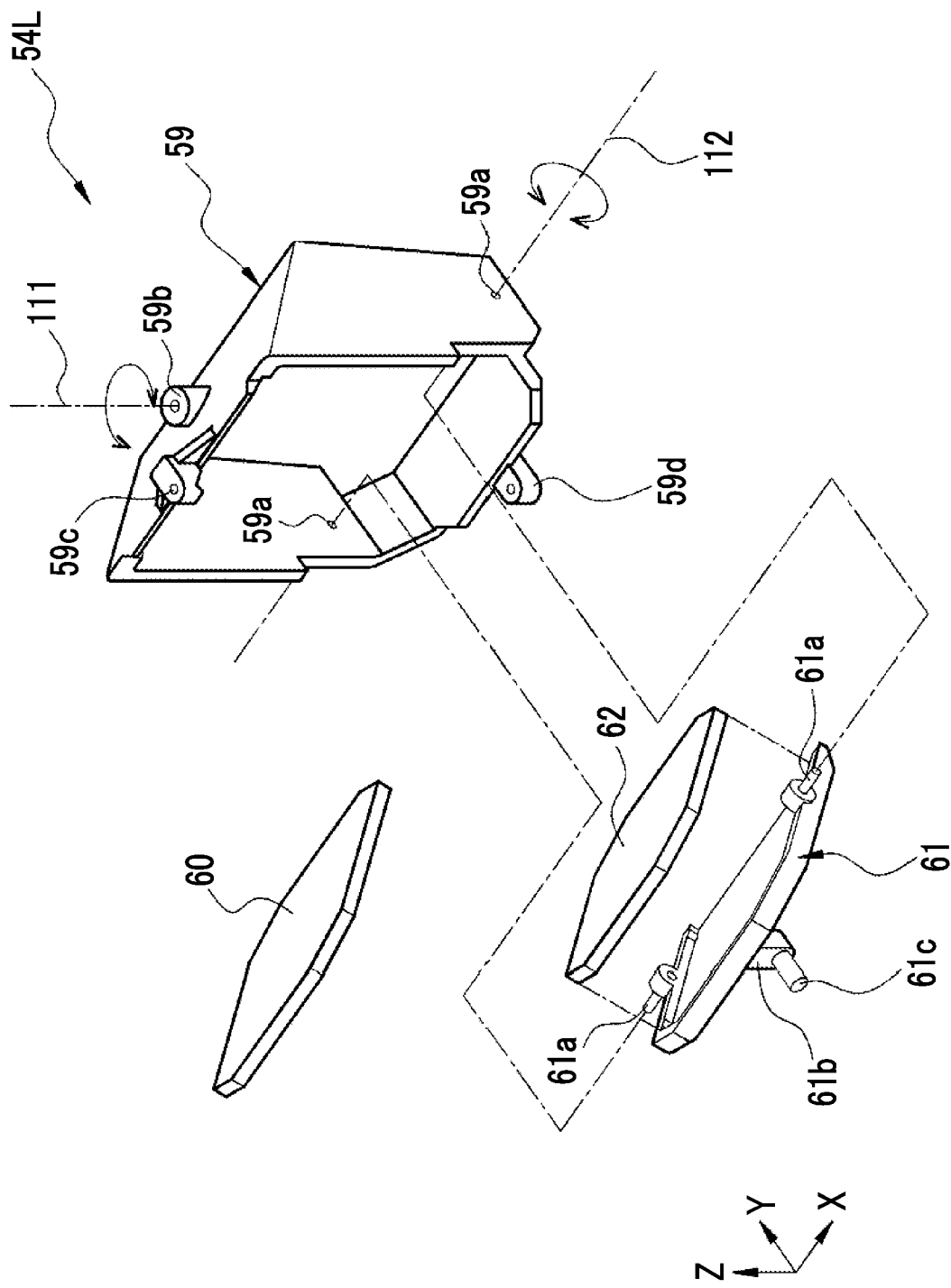
FIG. 13 is an exploded perspective view of a left anti-vibration unit including an anti-vibration optical system.

As shown in FIG. 13, the left anti-vibration unit 54L comprises a barrel 59, a first reflective member 60, a holding plate 61, and a second reflective member 62. The barrel 59 has a box shape of which a front side and a rear side are opened. The first reflective member 60 is fixed in the barrel 59. The holding plate 61 is rotatably supported in the barrel 59. The second reflective member 62 is fixed onto an upper surface of the holding plate 61. In each of the first reflective member 60 and the second reflective member 62, for example, a surface-reflection-type reflection mirror is used. The barrel 59 corresponds to a holding member of the present invention. The first reflective member 60 and the second reflective member 62 correspond to at least a part of optical members within the barrel.

The first reflective member 60 is inserted in the barrel 59, and is fixed onto an upper surface of an inner wall of the barrel 59 through an adhesive or the like such that a reflective surface thereof is oriented downward. As shown in FIG. 3, the upper surface of the inner wall of the barrel 59 viewed from the X axis direction is inclined at an angle of 45° with respect to a first optical axis 64a which is an optical axis of the left objective optical system 35L. Accordingly, the first reflective member 60 fixed within the barrel 59 is also held at an angle of 45° with respect to the first optical axis 64a.

Referring back to FIG. 13, the holding plate 61 is a rectangular-plate-like member. The second reflective member 62 is fixed onto the upper surface of the holding plate 61 through an adhesive or the like such that the reflective surface thereof is oriented upward. A pair of rotation pins 61a is provided on both side surfaces of the holding plate 61. The pair of rotation pins 61a is inserted into a pair of bearing holes 59a which is formed in both side surfaces of the barrel 59 in a case where the holding plate 61 is inserted into the barrel 59. Thereby, the holding plate 61 and the second reflective member 62 are rotatably held in the barrel 59. The pair of rotation pins 61a supported by the pair of bearing holes 59a constitutes a second rotational axis 112 of the present invention.

A bracket 61b, which protrudes downward, is provided on a lower surface of the holding plate 61. A connecting pin 61c, which protrudes in the Y axis direction, is provided on a distal end of the bracket 61b. The holding plate 61 is rotated by the link mechanism 55 with the connecting pin 61c interposed therebetween. In addition, in a state (neutral state: states of FIGS. 16 and 18) in which vibration does not occur on the binocle 30, an angle of the holding plate 61 is held by the link mechanism 55 such that the second reflective member 62 is parallel to the first reflective member 60.

Figure 17:
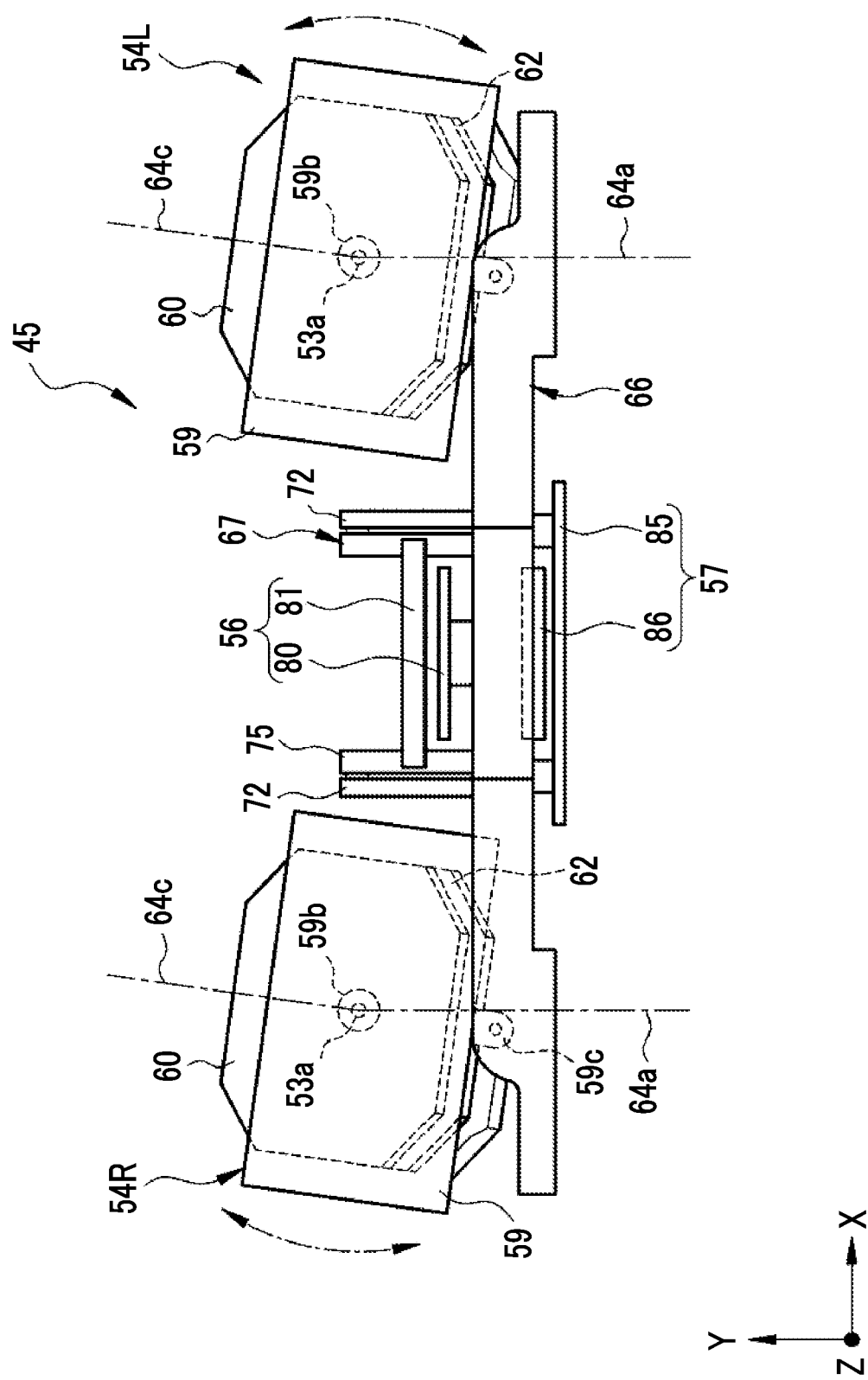
FIG. 17 is a plan view of the anti-vibration device at the time of blur correction.

As shown in FIGS. 3 and 17, a pair of bearing bosses 59b is provided on the same Z axis of an upper surface and a lower surface of the barrel 59. The bearing bosses 59b are rotatably supported by a pair of bearing pins 53a (see FIG. 3) vertically provided on an upper surface and a lower surface of an inner wall of the support member 53. Thereby, the first reflective member 60 and second reflective member 62 held by the barrel 59 are integrally rotatable around the Z axis. The bearing pins 53a supported by the pair of bearing bosses 59b function as a first rotational axis 111 (see FIGS. 13 and 14) of the present invention. Further, a pair of upper connection boss 59c and lower connection boss 59d is provided on the same Z axis on upper and lower portions of the front side of the barrel 59. The pair of upper connection boss 59c and lower connection boss 59d is used for connection with the link mechanism 55.

The first reflective member 60 deflects the first optical axis 64a of the left objective optical system 35L through reflection, and thereby forms a second optical axis 64b (see FIGS. 3 and 12) which is at a right angle with respect to the first optical axis 64a. The second optical axis 64b is parallel to the Z axis direction. The second reflective member 62 deflects the second optical axis 64b through reflection, and thereby forms a third optical axis 64c (see FIGS. 3 and 12) which is parallel to the first optical axis 64a. The first optical axis 64a and the third optical axis 64c are parallel to the Y axis direction.

Each rotation pin 61a of the holding plate 61 is on a second rotational axis 112 that passes through an intersection between the second optical axis 64b and a reflective surface of the second reflective member 62 and is perpendicular to a plane formed by the first optical axis 64a and the second optical axis 64b. Consequently, by rotating the second reflective member 62 around the rotation pins 61a, a deflection direction of the third optical axis 64c is changed. As a result, it is possible to correct image blurring in the pitch direction.

The bearing bosses 59b of the barrel 59 are concentrically provided with the second optical axis 64b such that center axes thereof match each other, and function as the first rotational axis 111. Accordingly, by integrally rotating the first reflective member 60 and the second reflective member 62 around the bearing bosses 59b, the deflection direction of the third optical axis 64c is changed. As a result, it is possible to correct image blurring in the yaw direction. The first rotational axis 111 is on a plane including the first optical axis 64a and the third optical axis 64c, and crosses the first optical axis 64a or the third optical axis 64c.

In addition, the right anti-vibration unit 54R has the same configuration as the left anti-vibration unit 54L, and is supported by the casing main body 50 so as to be rotatable around the Z axis in a manner similar to that of the left anti-vibration unit 54L. Further, the right anti-vibration unit 54R is connected to the link mechanism 55, with the same structure as the left anti-vibration unit 54L. Accordingly, a detailed description of the right anti-vibration unit 54R will be omitted.

Figure 14:
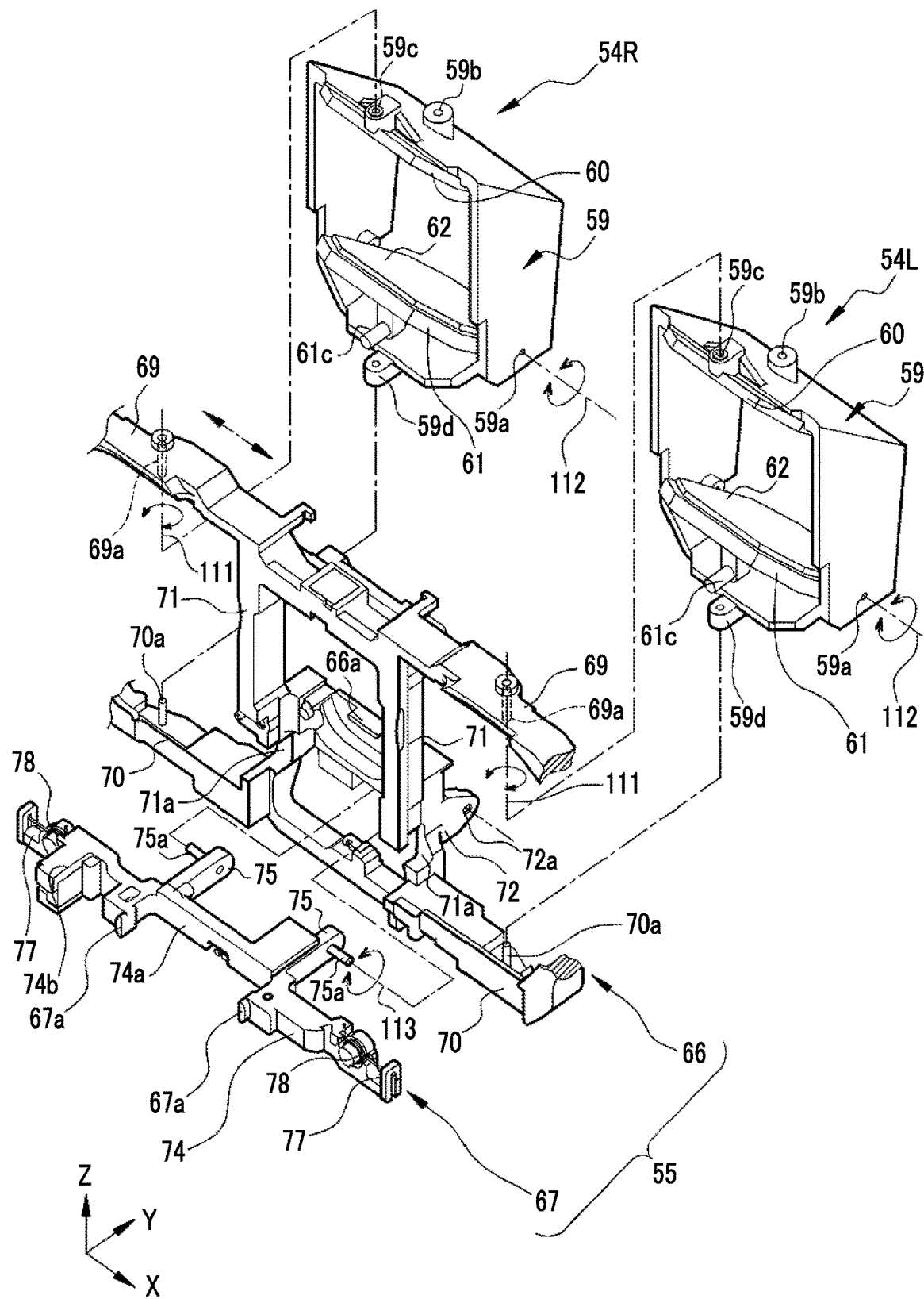
FIG. 14 is an exploded perspective view of a link mechanism.

As shown in FIG. 14, the link mechanism 55 comprises a first link member 66 and a second link member 67. The first link member 66 links the barrels 59 of the left anti-vibration unit 54L and the right anti-vibration unit 54R with each other. The pair of left and right barrels 59 linked by the first link member 66 is disposed in a state in which the first optical axes 64a are held in parallel with each other.

The pair of left and right barrels 59 is linked by the first link member 66, and thus, a barrel top plate having the bearing boss 59b and the upper connection boss 59c of the barrel 59 and a barrel lower plate having the bearing boss 59b and the lower connection boss 59d of the barrel 59 function as intermediate links. A four joint link portion that horizontally moves the first link member 66 in the X axis direction is constituted by the intermediate links.

The second link member 67 links the pair of left and right second reflective members 62 held by the left anti-vibration unit 54L and the right anti-vibration unit 54R with each other. The second link member 67 is rotatably supported by the first link member 66.

The first link member 66 comprises first brackets 69, second brackets 70, and a pair of connecting portions 71. A pair of left and right connecting pins 69a, which is inserted into the upper connection bosses 59c of the barrels 59, is provided on lower surfaces of the first brackets 69. A pair of connecting pins 70a, which is inserted into the lower connection bosses 59d of the barrels 59, on the left and right sides is provided on upper surfaces of the second brackets 70. The pair of connecting portions 71 is vertically disposed such that the first brackets 69 and the second brackets 70 are integrally formed.

A pair of left and right third brackets 72 (see FIGS. 16 and 17) is provided on the pair of connecting portions 71 between the barrels 59. The third brackets 72 protrude toward the ocular optical systems 36L and 36R in the Y axis direction. Connection holes 72a are respectively formed in the third brackets 72 on the same X axis. Further, notches 71a are respectively provided in the pair of connecting portions 71 on a side opposite to a side on which the third brackets 72 are provided. The second link member 67 is accommodated within the notches 71a.

The second link member 67 comprises a stick-like link main body 74 and a pair of left and right connecting arms 75. The link main body 74 is elongated along the X axis direction. The pair of left and right connecting arms 75 is provided on the link main body 74 between the barrels 59. The connecting arms 75 protrude toward the ocular optical systems 36L and 36R in the Y axis direction. The connecting arms 75 are provided inside the third brackets 72 near the third brackets 72 (see FIGS. 16 and 17).

Connecting pins 75a are provided on side surfaces of the connecting arms 75. The connecting pins 75a are inserted into the connection holes 72a formed in the third brackets 72 of the first link member 66. The connecting pins 75a supported by the connection holes 72a constitute a third rotational axis 113 (see FIG. 21). The second link member 67 links the third brackets 72 with the connecting arms 75 constituting the third rotational axis 113, and is supported by the first link member 66 so as to be rotatable around the third rotational axis 113.

Figure 15:
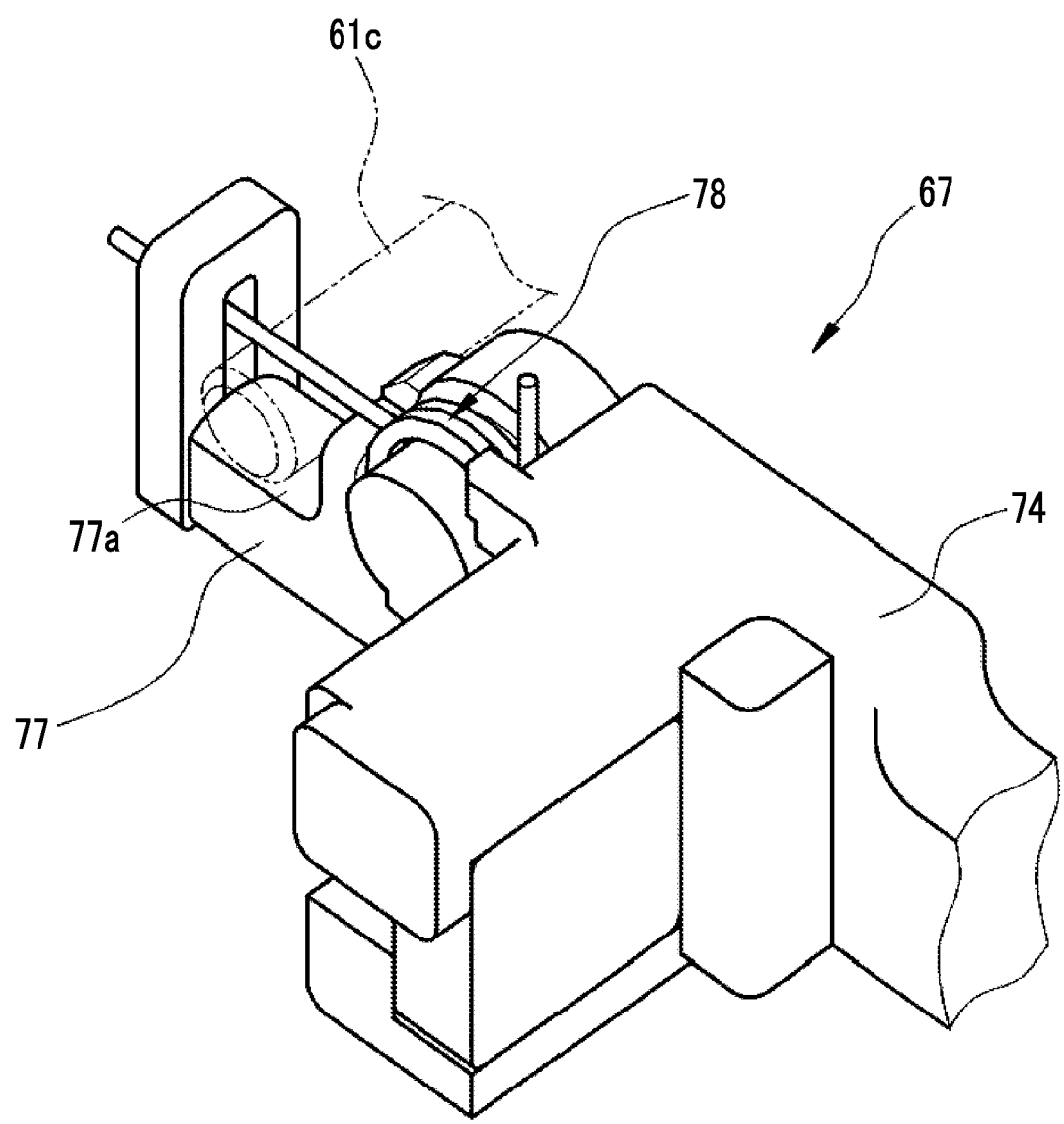
FIG. 15 is a perspective view illustrating a shape of an end portion of a second link member.

Abutment portions 77 are respectively formed on both ends of the link main body 74. The abutment portions 77 abut onto the connecting pins 61c of the holding plate 61. As shown in FIG. 15, an abutment surface 77a of the abutment portion 77 is formed as a convex circumferential surface. The abutment surface 77a and the connecting pin 61c come in contact with each other by the circumferential surface, and thus, the abutment portion 77 and the connecting pin 61c come contact with each other through point contact even though the second link member 67 is rotated. Accordingly, a distance between the centers thereof is not changed. Therefore, the rotation of the second link member 67 can be smoothly transferred to the connecting pins 61c.

A pair of urging members 78 is attached to both ends of the link main body 74. The urging members 78 urge the connecting pins 61c of the holding plates 61 such that the connecting pins abut on the abutment portions 77. As the urging members 78, for example, leaf springs or torsion coil springs made of metal are used. The urging members 78 urge the connecting pins 61c, and thus, the abutment portions 77 abut on the connecting pins 61c. As a result, the link main body 74 engages with the pair of left and right second reflective members 62 through the holding plates 61.

Figure 16:
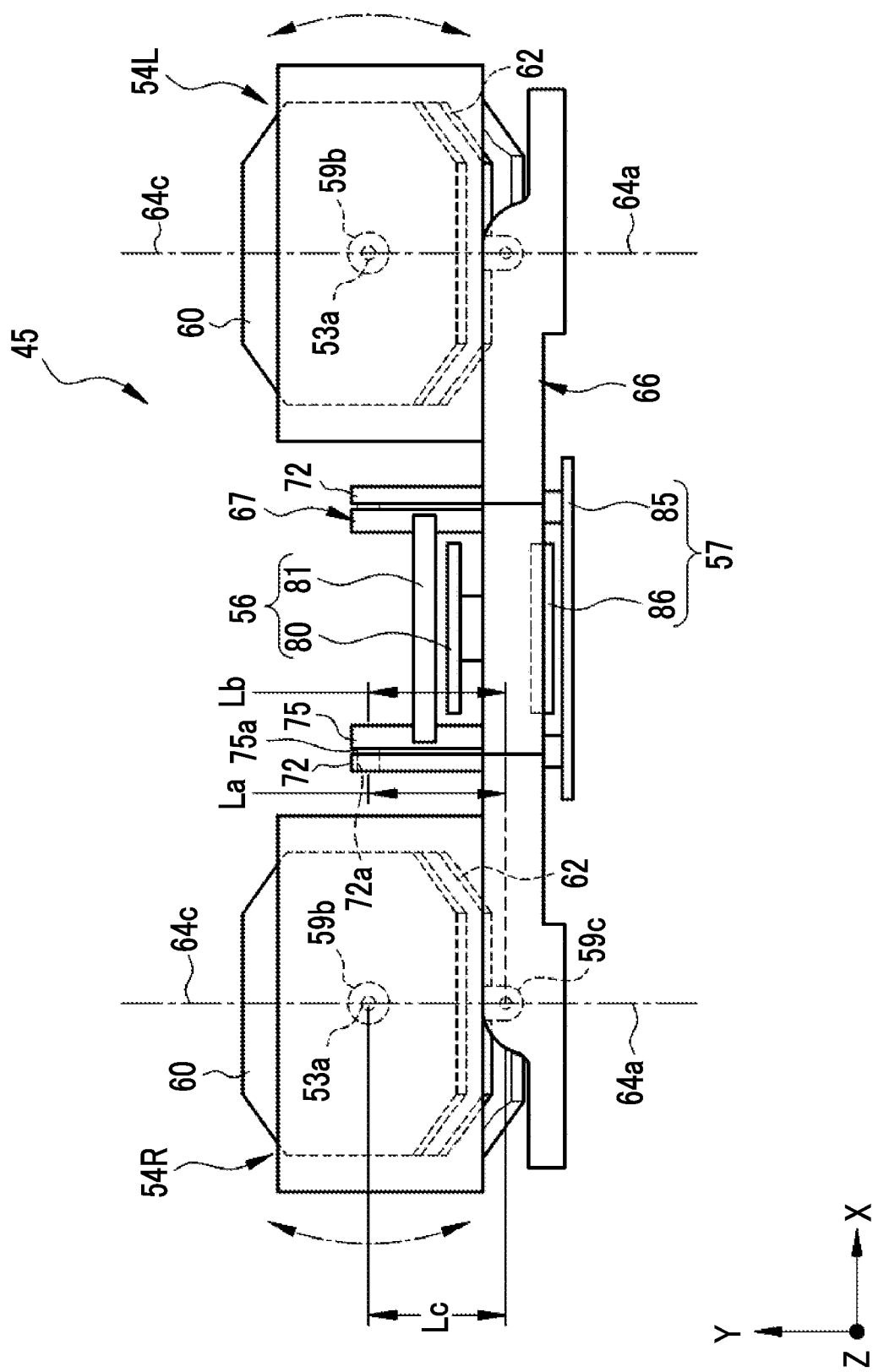
FIG. 16 is a plan view of the anti-vibration device.

As shown in FIGS. 16 and 17, the link mechanism 55 rotates the barrels 59 of the left anti-vibration unit 54L and the right anti-vibration unit 54R around the first rotational axes 111 parallel to the Z axes with the bearing bosses 59b as the centers by moving the first link member 66 in the X axis direction. Thereby, the first reflective member 60 and the second reflective member 62 of the left anti-vibration unit 54L and the right anti-vibration unit 54R are respectively integrally rotated, and therefore a deflection direction of the third optical axis 64c is changed. As a result, image blurring in the yaw direction is corrected.

Figure 18:
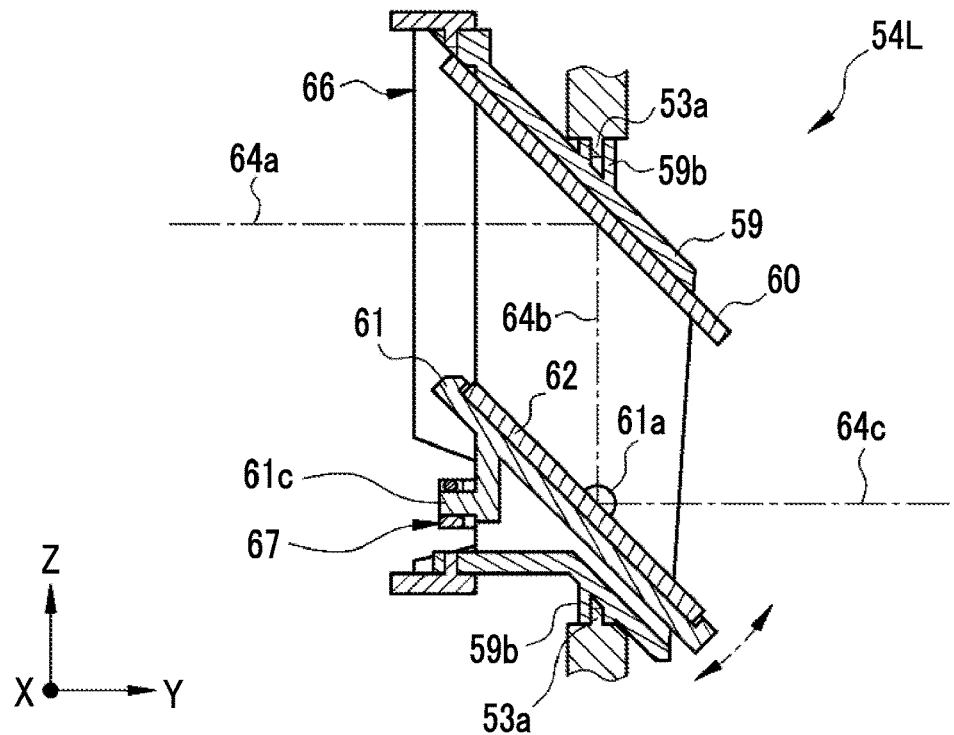
FIG. 18 is a vertical cross-section view taken along a left-eye optical axis of the anti-vibration device.
Figure 19:
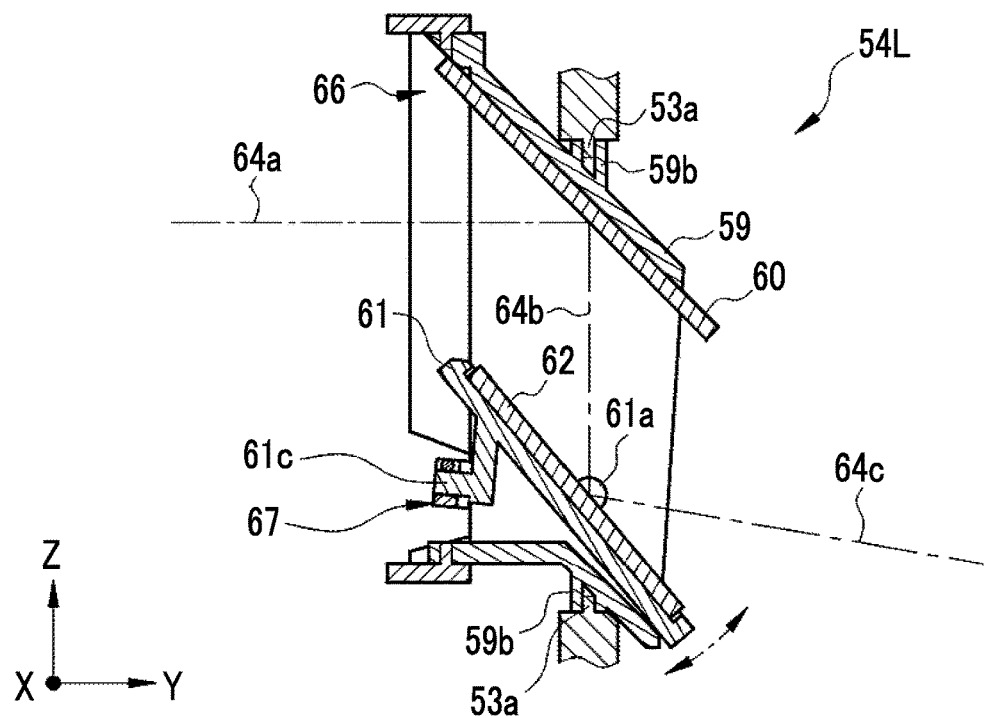
FIG. 19 is a vertical cross-section view taken along the left-eye optical axis of the anti-vibration device at the time of blur correction.

Further, as shown in FIGS. 18 and 19, in a case where the second link member 67 was rotated around the connecting pins 75a (third rotational axis 113), the second reflective members 62 of the left anti-vibration unit 54L and the right anti-vibration unit 54R are respectively rotated. Therefore, the deflection direction of the third optical axis 64c is changed, and thus, image blurring in the pitch direction is corrected.

As shown in FIGS. 14 and 16, it should be noted that a length (a length from the connecting pin 69a to the connection hole 72a) La of the third bracket 72 of the first link member 66 in the Y axis direction, a length (a length from the center of the link main body 74 to the connecting pin 75a) Lb of the connecting arm 75 of the second link member 67 in the same direction, and a length Lc from the upper connection boss 59c of the barrel 59 to the bearing boss 59b are equal to each other. The height of the connection hole 72a to which the connecting pin 75a constituting the third rotational axis 113 is connected in the Z axis direction and the height of the bearing hole 59a into which the rotation pin 61a constituting the second rotational axis 112 is inserted in the Z axis direction are equal to each other. Accordingly, the second rotational axis 112 and the third rotational axis 113 are concentrically disposed with each other such that central lines thereof match each other. The length Lc, which is a radius of rotation in a case where the anti-vibration units 54 are rotated by the first link member 66, and the lengths Lb and Lc, which are radii of rotations in a case where the second reflective members 62 are rotated by the second link member 67, are equal to each other. Therefore, in a state where the anti-vibration units 54 are rotated around the first rotational axes 111 and inclined, rotation of the second link member 67 is possible.

Figure 21:
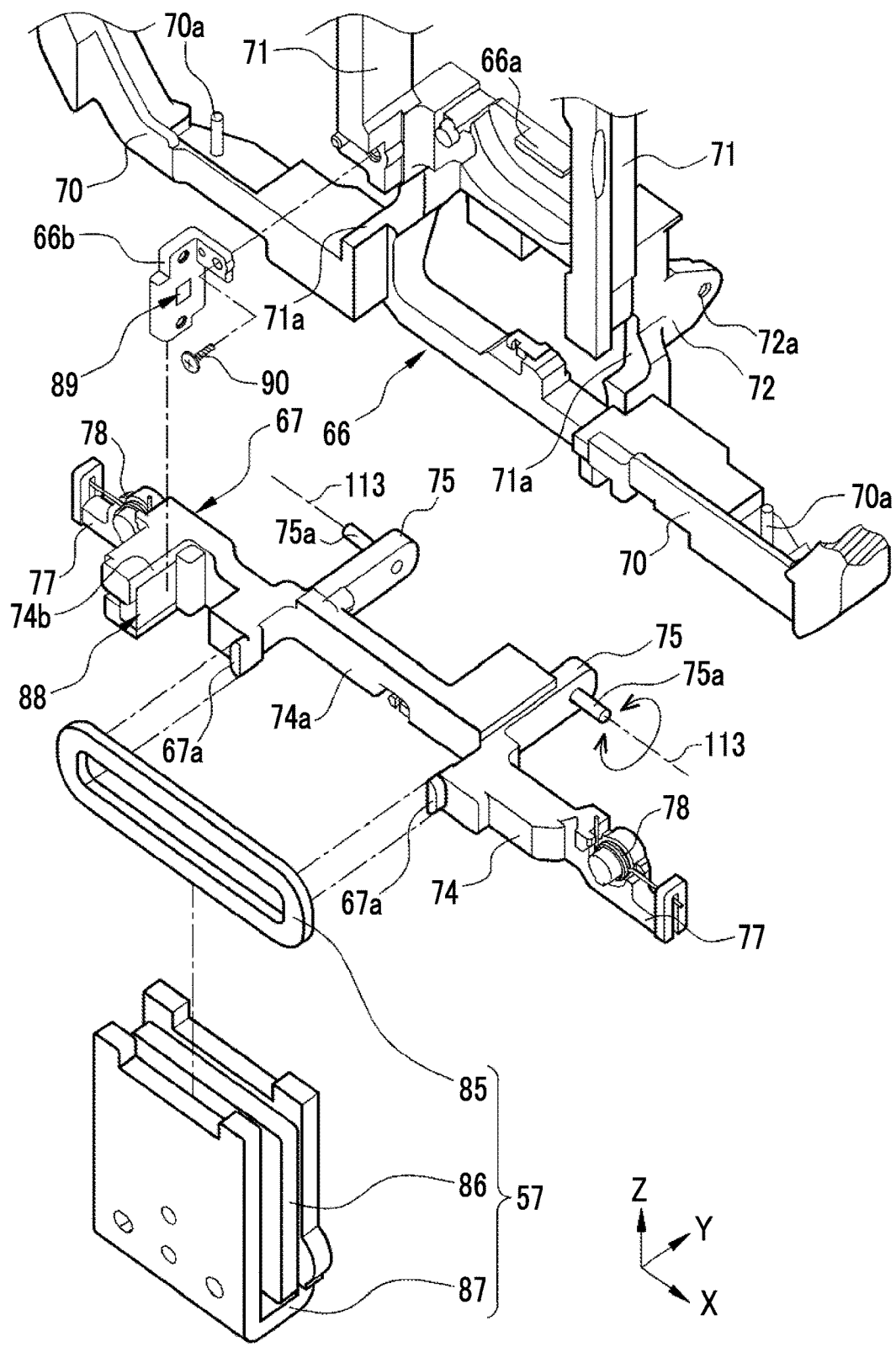
FIG. 21 is a perspective view of a second voice coil motor and a Z-axis position sensor.

The first voice coil motor 56 and the second voice coil motor 57 constitute a drive unit 58 (see FIG. 23) of the present embodiment first together with a detection magnet 88 and a Z-axis position sensor 89 (see FIG. 21). As shown in FIG. 2, the first voice coil motor 56 and the second voice coil motor 57 are positioned in a middle region between the left telephoto optical system 37L and the right telephoto optical system 37R. The middle region between the left telephoto optical system 37L and the right telephoto optical system 37R is a region which is interposed between the left telephoto optical system 37L and the right telephoto optical system 37R in the X axis direction and is positioned between the front ends of the left objective optical system 35L and the right objective optical system 35R and the rear ends of the left ocular optical system 36L and the right ocular optical system 36R in the Y axis direction.

Figure 20:
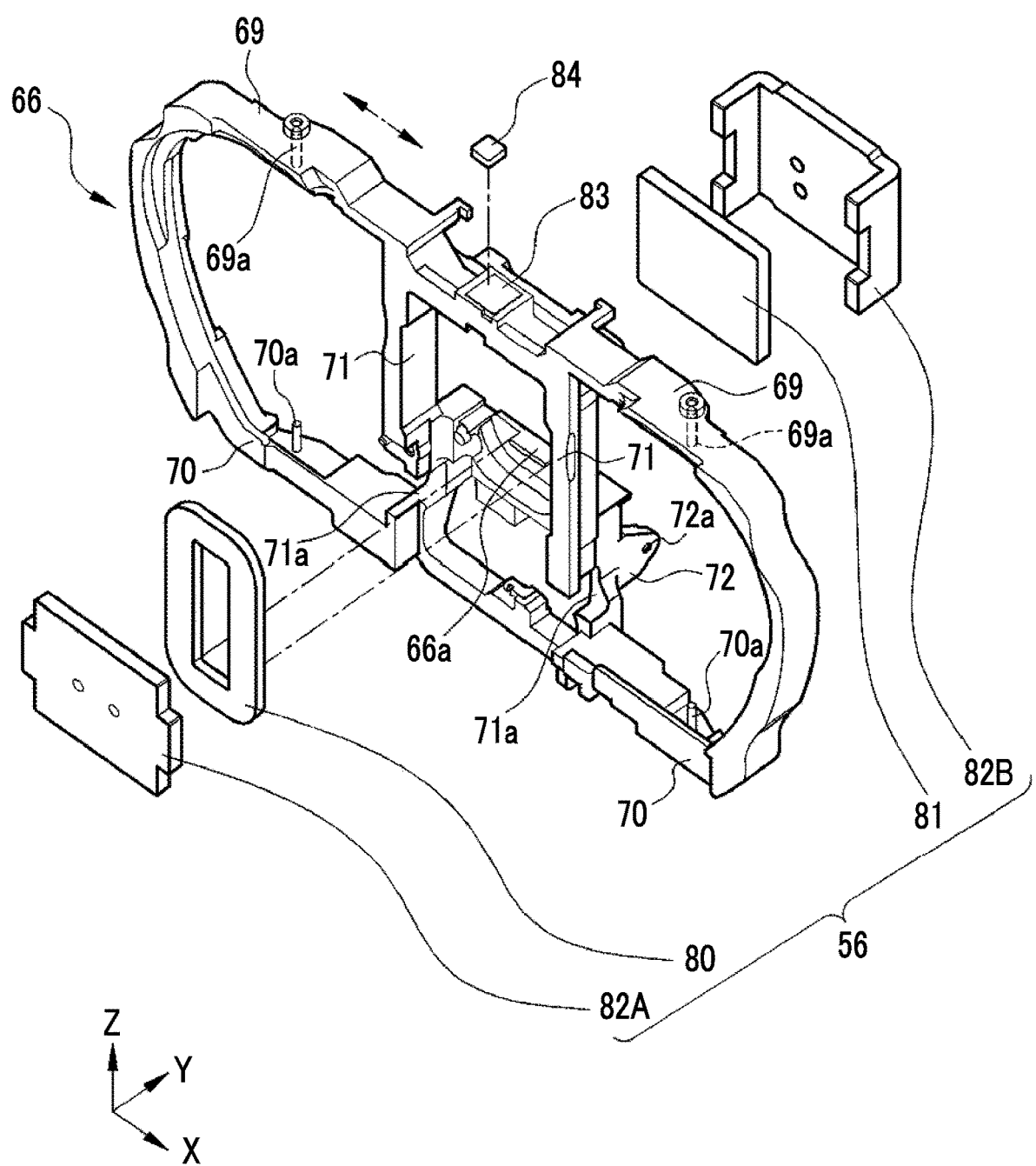
FIG. 20 is a perspective view of a first voice coil motor and an X-axis position sensor.

As shown in FIG. 20, the first voice coil motor 56 includes a first coil 80, a first driving magnet 81, and yokes 82A and 82B. The first coil 80 is obtained by winding a copper wire, and is a cylindrical air-core coil having a substantially rectangular cross section. The first coil is attached to an attachment portion 66a of the first link member 66.

The yokes 82A and 82B are made of a metal plate, and are disposed so as to pinch the first coil 80 and the first driving magnet 81. The yokes guide magnetism of the first driving magnet 81 to the first coil 80. The yoke 82B is formed in a U-shaped cross section that covers a rear surface and both side surfaces of the first driving magnet 81, and is fixed to the casing main body 50. The yoke 82B attracts the first driving magnet 81 through the magnetism of the first driving magnet 81. The yoke 82A is fixed integrally with the yoke 82B, and covers a front side of the first driving magnet 81. The first coil 80 is disposed between the yoke 82A and the first driving magnet 81, and is movable within a magnetic field generated by the first driving magnet 81.

The first voice coil motor 56 is a so-called flat-coil-type voice coil motor, and drives the first link member 66 by applying current to the first coil 80 and moving the first coil 80 in the X axis direction in magnetic field of the first driving magnet 81. The first voice coil motor 56 is driven, and thus, the first link member 66 moves along the X axis direction.

A detection magnet 83 is buried in an upper surface of the first bracket 69. Meanwhile, an X-axis position sensor 84 is provided on an upper surface of an inner wall of the casing main body 50. The X-axis position sensor 84 is disposed so as to face the detection magnet 83, and measures a movement amount of the first link member 66 including the first coil 80 in the X axis direction. The X-axis position sensor 84 is, for example, a magnetic sensor such as a Hall element, detects magnetic field of the detection magnet 83, and outputs a detection signal according to an intensity of the magnetism.

As shown in FIG. 21, the second voice coil motor 57 includes a second coil 85, a second driving magnet 86, and a yoke 87. Similarly to the first coil 80, the second coil 85 is made of a copper line, and is a cylindrical air-core having a substantially rectangular cross section. The second coil is attached to a pair of attachment portions 67a of the second link member 67.

The link main body 74 has a notch 74a in the center. The second driving magnet 86 is disposed within the notch 74a. The pair of attachment portions 67a is formed so as to protrude forwards from the notch 74a. Thus, the second driving magnet 86 is disposed on the rear side of the second coil 85. The yoke 87 is made of a metal plate, and is disposed so as to pinch the second coil 85 and the second driving magnet 86. The yoke guides magnetism of the second driving magnet 86 to the second coil 85. The yoke 87 is formed in a U-shaped cross section that covers a front surface and a rear surface of the second driving magnet 86, and is fixed to the yoke 82A of the first voice coil motor 56 through a connection member (not shown). The yoke 87 attracts the second driving magnet 86 through the magnetism of the second driving magnet 86. The second coil 85 is disposed between the yoke 87 and the second driving magnet 86, and is movable within a magnetic field generated by the second driving magnet 86.

The second voice coil motor 57 is a voice coil motor which is the same as the first voice coil motor 56, and drives the second link member 67 by applying current to the second coil 85 and moving the second coil 85 in the Z axis direction in magnetic field of the second driving magnet 86. The second voice coil motor 57 is driven, and thus, the second link member 67 is rotated around the third rotational axis 113.

A holding portion 74b is formed at the link main body 74. The detection magnet 88 is buried in the holding portion 74b. That is, the detection magnet 88 moves integrally with the second link member 67. The holding portion 74b is disposed on a side on which the right anti-vibration unit 54R is positioned with respect to the notch 74a. The Z-axis position sensor 89 is attached to the first link member 66 through a holding piece 66b. The Z-axis position sensor 89 is disposed such that a detection surface 89a (see FIG. 23, and FIGS. 24A to 24D) faces the detection magnet 88, and measures a movement amount of the second link member 67 including the second coil 85 in the Z axis direction. The Z-axis position sensor 89 is the same magnetic sensor as the X-axis position sensor 84, detects magnetic field of the detection magnet 88, and outputs a detection signal according to an intensity of the magnetism.

The holding piece 66b has a rectangular frame shape that covers a surrounding area of the Z-axis position sensor 89. For example, the holding piece 66b is fastened to the first link member 66 through a coupling screw 90, and holds the Z-axis position sensor 89 so as to be spaced from the second coil 85 in the X axis direction and is pinched between the attachment portion 67a and the holding portion 74b. Accordingly, the detection magnet 88 is disposed on a side opposite to the second coil 85 with respect to the Z-axis position sensor 89 in the X axis direction, that is, on a side on which the right anti-vibration unit 54R is positioned.

The holding piece 66b has rigidity, and holds the Z-axis position sensor 89 with a predetermined distance D (see FIGS. 24A to 24D) from the detection magnet 88 in the X axis direction. For example, in a case where a movement stroke (a maximum value of a displacement amount) of the detection magnet 88 in the X axis direction is HMAX (see FIG. 24A), it is preferable that the predetermined distance D is 50% to 200% of the movement stroke HMAX.

Figure 22:
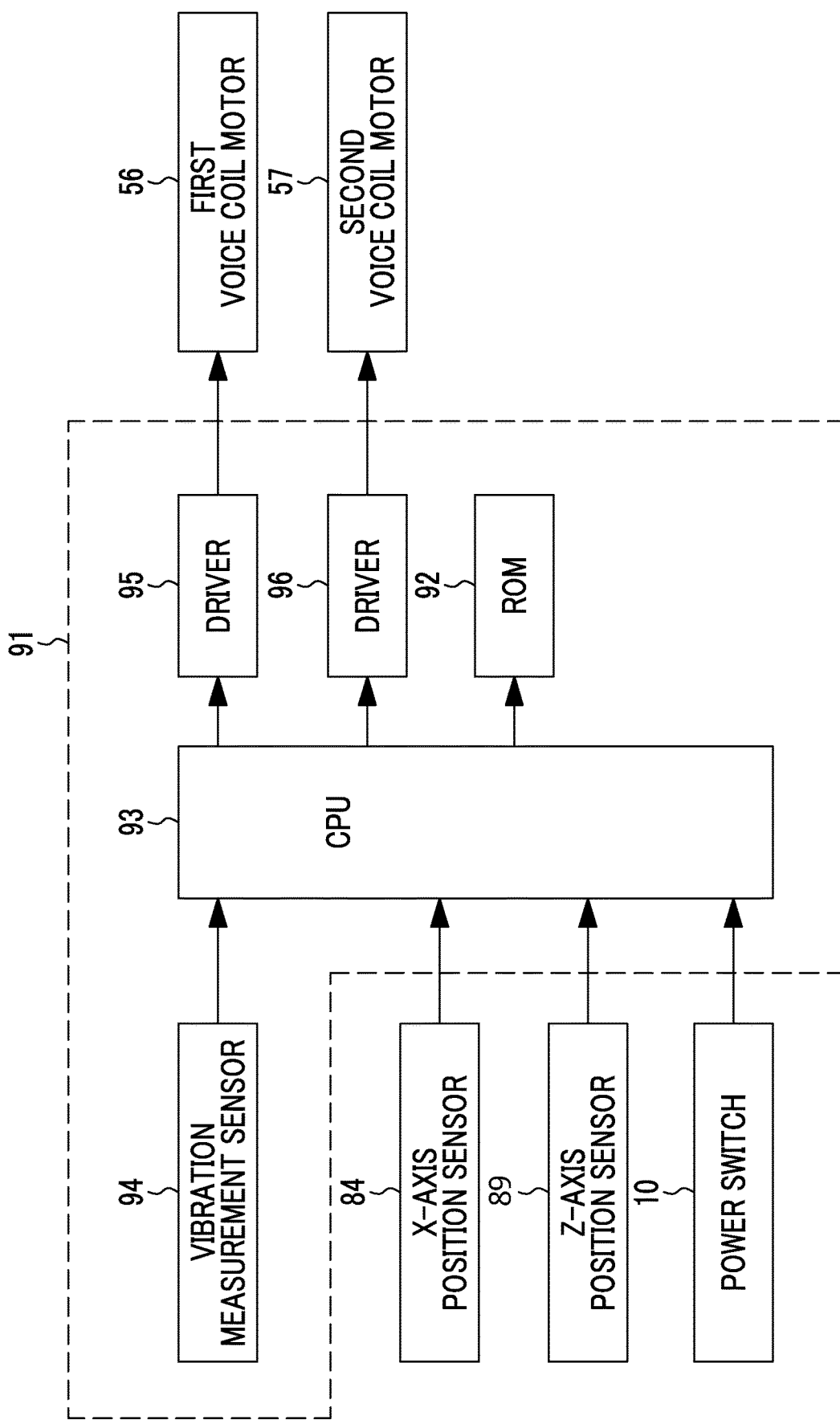
FIG. 22 is a block diagram of an anti-vibration control circuit.

As shown in FIG. 22, an anti-vibration control circuit 91 provided on the control substrate 46 comprises a read only memory (ROM) 92, a central processing unit (CPU) 93, a vibration measurement sensor 94, and drivers 95 and 96. The ROM 92 stores a control program. The CPU 93 controls the anti-vibration device 45 on the basis of the control program. The vibration measurement sensor 94 measures amounts of vibration of the binocle 30 around the X and Z axes. The drivers 95 and 96 respectively drive the first voice coil motor 56 and the second voice coil motor 57 so as to cancel the image blurring according to the vibration amount measured by the vibration measurement sensor 94. The CPU 93 is connected to the power switch 10, the X-axis position sensor 84, and the Z-axis position sensor 89. The anti-vibration control circuit 91 is actuated in a case where the power switch 10 is turned on, and drives the first voice coil motor 56 and the second voice coil motor 57 through the drivers 95 and 96 under the control of the CPU 93 in response to the detection signals from the X-axis position sensor 84 and the Z-axis position sensor 89. Thus, the image blurring is cancelled.

Figure 23:
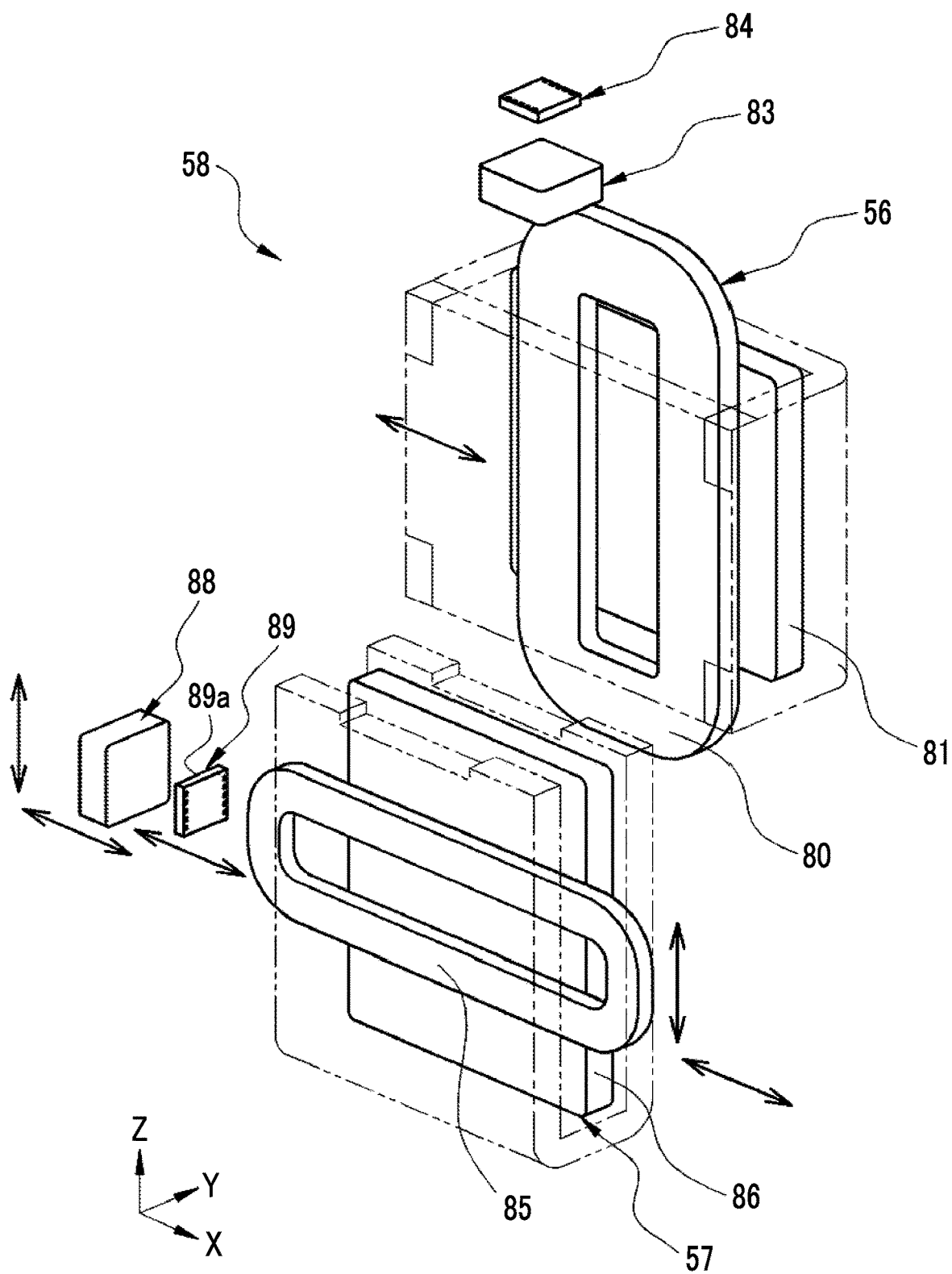
FIG. 23 is a perspective view illustrating a configuration of a drive unit.

As shown in FIG. 23, the anti-vibration device 45 corrects the image blurring of the optical image by driving the drive unit 58 constituted by the first voice coil motor 56, the second voice coil motor 57, the detection magnet 88, and the Z-axis position sensor 89. Since the second coil 85 and the detection magnet 88 are attached to the first link member 66 through the second link member 67 and the first coil 80 and the Z-axis position sensor 89 are fixedly attached to the first link member 66, in a case where the first coil 80 enters an energized state, the first coil 80, the second coil 85, the detection magnet 88, and the Z-axis position sensor 89 move in the X axis direction. Meanwhile, in a case where the second coil 85 enters an energized state, the second coil 85 and the detection magnet 88 move in the Z axis direction, but the first coil 80 and the Z-axis position sensor 89 do not move in the Z axis direction.

Since the detection magnet 83 is fixedly attached to the first link member 66, in a case where the first coil 80 enters the energized state, the detection magnet 83 moves integrally with the first coil 80 in the X axis direction. Meanwhile, in a case where the second coil 85 enters the energized state, the detection magnet 83 does not move in the Z axis direction. Since the X-axis position sensor 84 is attached to the casing main body 50, even in a case where any of the first coil 80 and the second coil 85 enters the energized state, the X-axis position sensor does not move in the X axis direction and the Y axis direction.

Figure 24A:
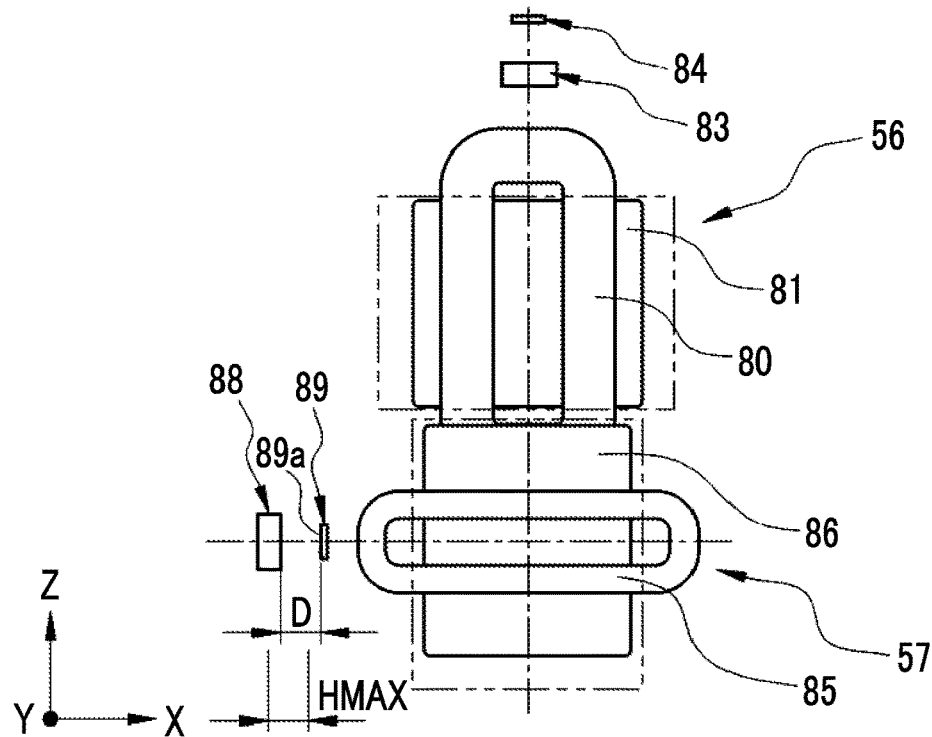
FIG. 24A is an explanatory diagram showing the drive unit in the neutral state.
Figure 24B:
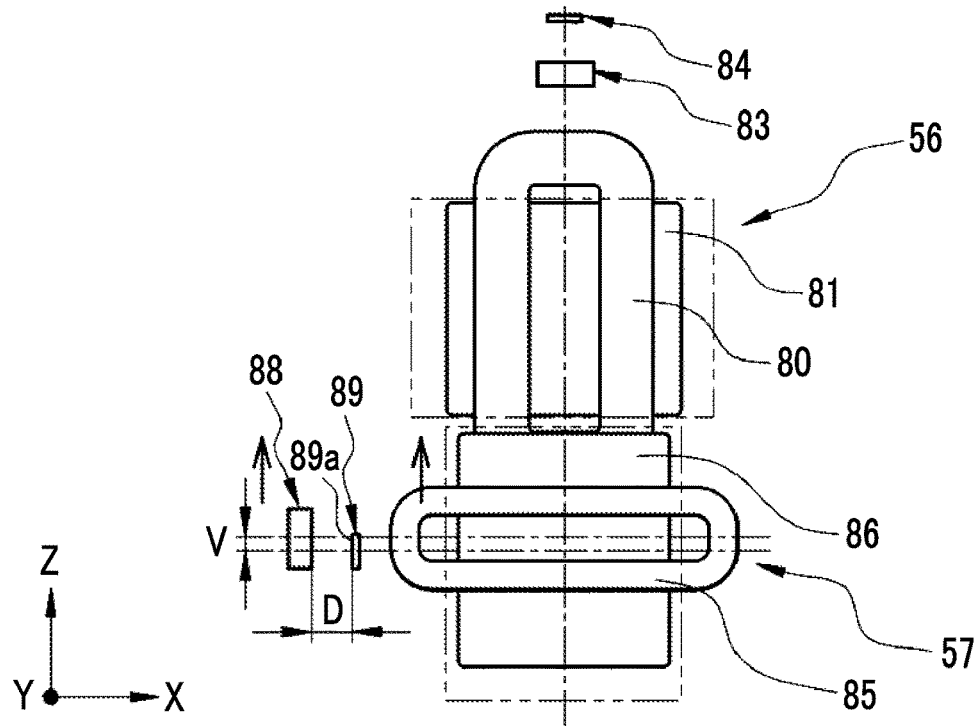
FIG. 24B is an explanatory diagram showing the drive unit in a state in which a first coil enters a deenergized state and a second coil enters an energized state.

As shown in FIG. 24A, in a case where the anti-vibration device 45 enters a neutral state, the second coil 85, the detection magnet 88, and the Z-axis position sensor 89 are disposed in the same position in the Z axis direction. As shown in FIG. 24B, in a case where the second coil 85 enters the energized state and the first coil 80 enters a deenergized state, since the detection magnet 88 moves integrally with the second coil 85 in the Z axis direction, the magnetism detected by the Z-axis position sensor 89 is changed. That is, the Z-axis position sensor 89 can detect a displacement amount V of the detection magnet 88 in the Z axis direction.

Figure 24C:
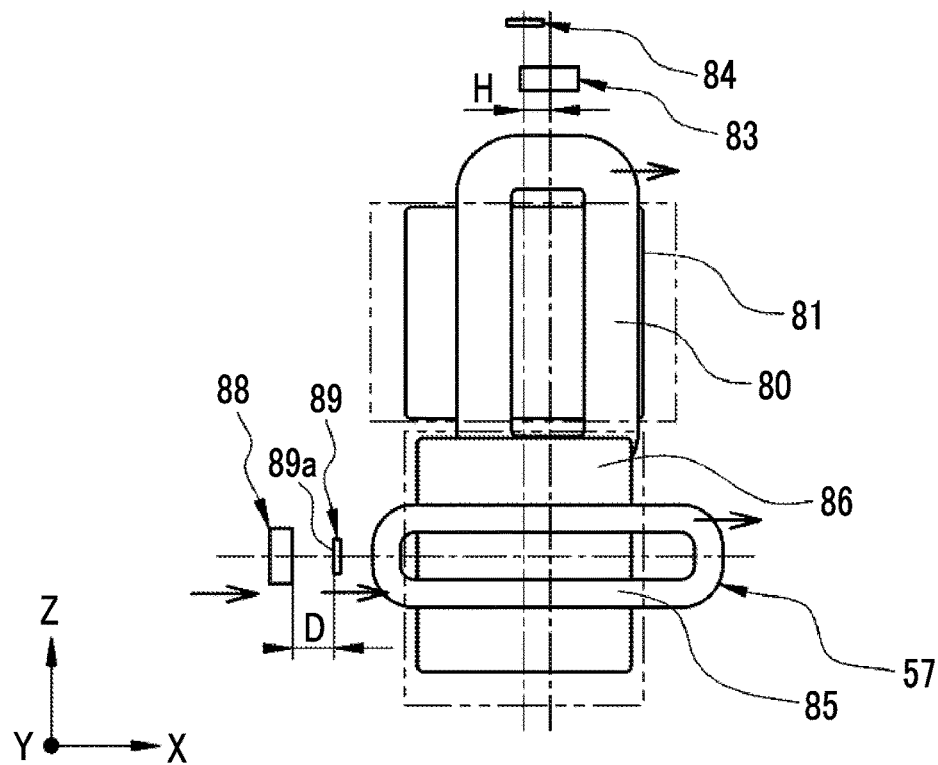
FIG. 24C is an explanatory diagram showing the drive unit in a state in which the first coil enters an energized state and the second coil enters a deenergized state.

As shown in FIG. 24C, in a case where the first coil 80 enters the energized state and the second coil 85 enters the deenergized state, the first coil 80, the second coil 85, the detection magnet 88, and the Z-axis position sensor 89 move in the X axis direction. In this case, the second coil 85 and the detection magnet 88 do not move in the Z axis direction. Since the detection magnet 88 and the Z-axis position sensor 89 move in the X axis direction while maintaining a predetermined distance D and the detection magnet 88 does not move in the Z axis direction, the magnetism detected by the Z-axis position sensor 89 is not changed. That is, the displacement amount of the detection magnet 88 in the Z axis direction is not detected (displacement amount is 0). Meanwhile, since the detection magnet 83 moves integrally with the first coil 80 in the X axis direction, a displacement amount H of the detection magnet 83 in the X axis direction is able to be detected.

Figure 24D:
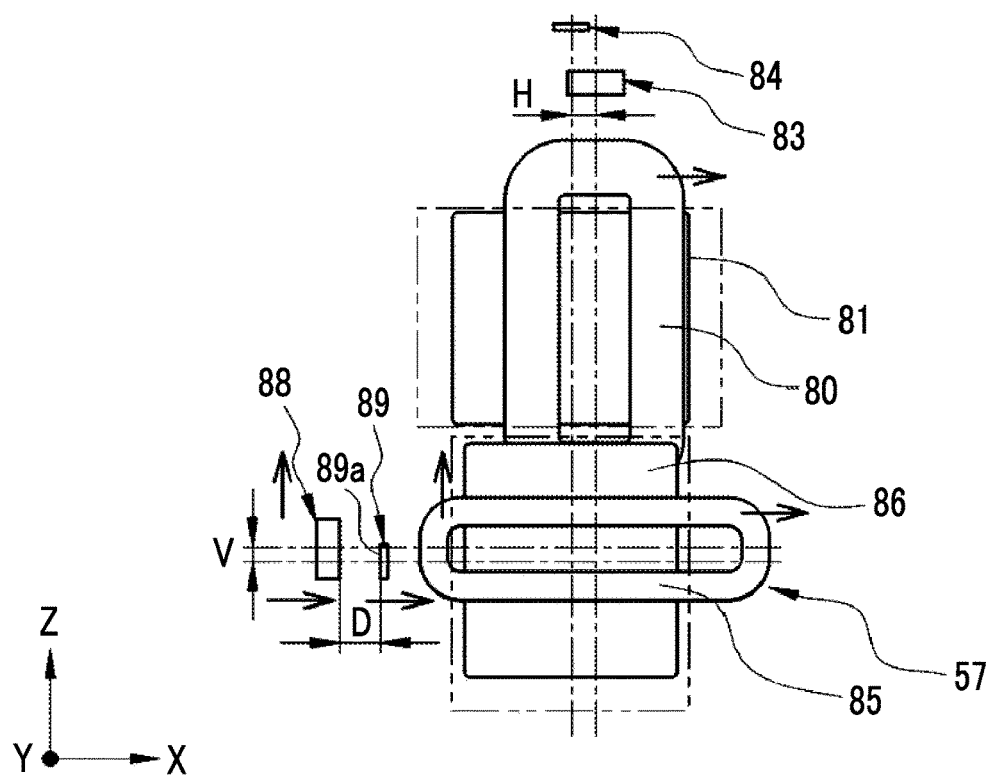
FIG. 24D is an explanatory diagram showing the drive unit in a state in which the first coil and the second coil enter the energized state.

As shown in FIG. 24D, in a case where the first coil 80 and the second coil 85 enter the energized state, the detection magnet 88 moves integrally with the second coil 85 in the Z axis direction while the first coil 80, the second coil 85, the detection magnet 88, and the Z-axis position sensor 89 move in the X axis direction. Thus, the magnetism detected by the Z-axis position sensor 89 is changed. That is, the Z-axis position sensor 89 can detect the displacement amount of the detection magnet 88 in the Z axis direction while moving integrally with the first coil 80 in the X axis direction. Since the detection magnet 83 moves integrally with the first coil 80 in the X axis direction, the X-axis position sensor 84 can detect the displacement amount H of the detection magnet 83 in the X axis direction.

Next, effects of the above-mentioned embodiment will be described. For example, the binocle 30 is used while holding the left telephoto optical system 37L with the left hand and the right telephoto optical system 37R with the right hand. In this case, the middle fingers or the index fingers of both hands are stretched, and thus, the fingers can be gripped on the finger gripping portions 11a of the operation dial 11.

In the operation dial 11, in a case where the right finger gripping portion 11a is pushed downwards, the intermediate lever 21 and the swing lever 25 of the interlocking mechanism 12 swing, and the first abutment portion 25b of the swing lever 25 is pushed. Thus, the reception member 13 moves downwards (see FIG. 9). In a case where the left finger gripping portion 11a is pushed, the intermediate lever 21 and the swing lever 25 of the interlocking mechanism 12 swing, and the second abutment portion 25c of the swing lever 25 is pushed. Thus, the reception member 13 moves downwards (see FIG. 10). As stated above, the reception member 13 can be lowered downwards by the pushing operation for any of the left and right finger gripping portions 11a.

The reception member 13 moves downwards, and thus, the stepped portion 13e comes in contact with the engagement portion 14d of the switch main body 14, and the first switch portion 14b is bent. Thus, since the first and second switch portions 14b and 14c come in contact and are closed, the switch main body 14 is turned on. Immediately before the switch main body 14 is turned on, the anti-vibration regulating lever 15 starts to be displaced to the anti-vibration position from the anti-vibration regulating position, and the regulating pins 15d and 15e are separated from the engagement holes 66c and 67b. Thus, the first link member 66 and the second link member 67 can move, and the anti-vibration control is started.

The fingers are separated from the finger gripping portions 11a or the fingers are relaxed, and thus, the reception member 13 slides upwards by the urging of the coil springs 26a and 26b, and is returned to an initial position. The operation dial 11 is also interlocked with the movement of the reception member 13 to the initial position, and is returned to the neutral position by the urging of the torsion coil spring 19. In a case where the reception member 13 is returned to the initial position, the anti-vibration regulating lever 15 is positioned in the anti-vibration regulating position shown in FIGS. 6 and 7 from the anti-vibration position, and the regulating pins 15d and 15e engage with the engagement holes 66c and 67b. Thus, the movement of the first link member 66 and the second link member 67 is regulated. In a case where the reception member 13 is returned to the initial position, since the engagement portion 14d of the switch main body 14 is separated from the stepped portion 13e, the switch main body 14 is opened, and thus, the anti-vibration control is turned off.

As stated above, it is possible to move the anti-vibration device 45 as much as the finger gripping portions 11a are pushed, and it is possible to suppress power consumption compared to a case where anti-vibration device is constantly turned on. It is possible to perform the anti-vibration control with a simple operation as much as the fingers are gripped to the finger gripping portions 11a of the operation dial 11 and are stretched, and usability is improved.

The finger gripping portion 11a of the operation dial 11 is formed so as to protrude toward both sides from a dial main body, and a distance between the finger gripping portions 11a in the X-axis direction is roughly separated as much as a diameter of the dial main body. Thus, the finger gripping portions 11a are positioned so as to be separated toward both sides from the central portion of the binocle 30 as much as the diameter of the dial main body. Accordingly, it is not necessary to operate the dial main body while deviating the right hand or the left hand from a gripping position. The fingers of any of the right hand and the left hand simply access the finger gripping portions 11a, and thus, it is possible to turn on the switch main body 14.

Second Embodiment

Figure 25:
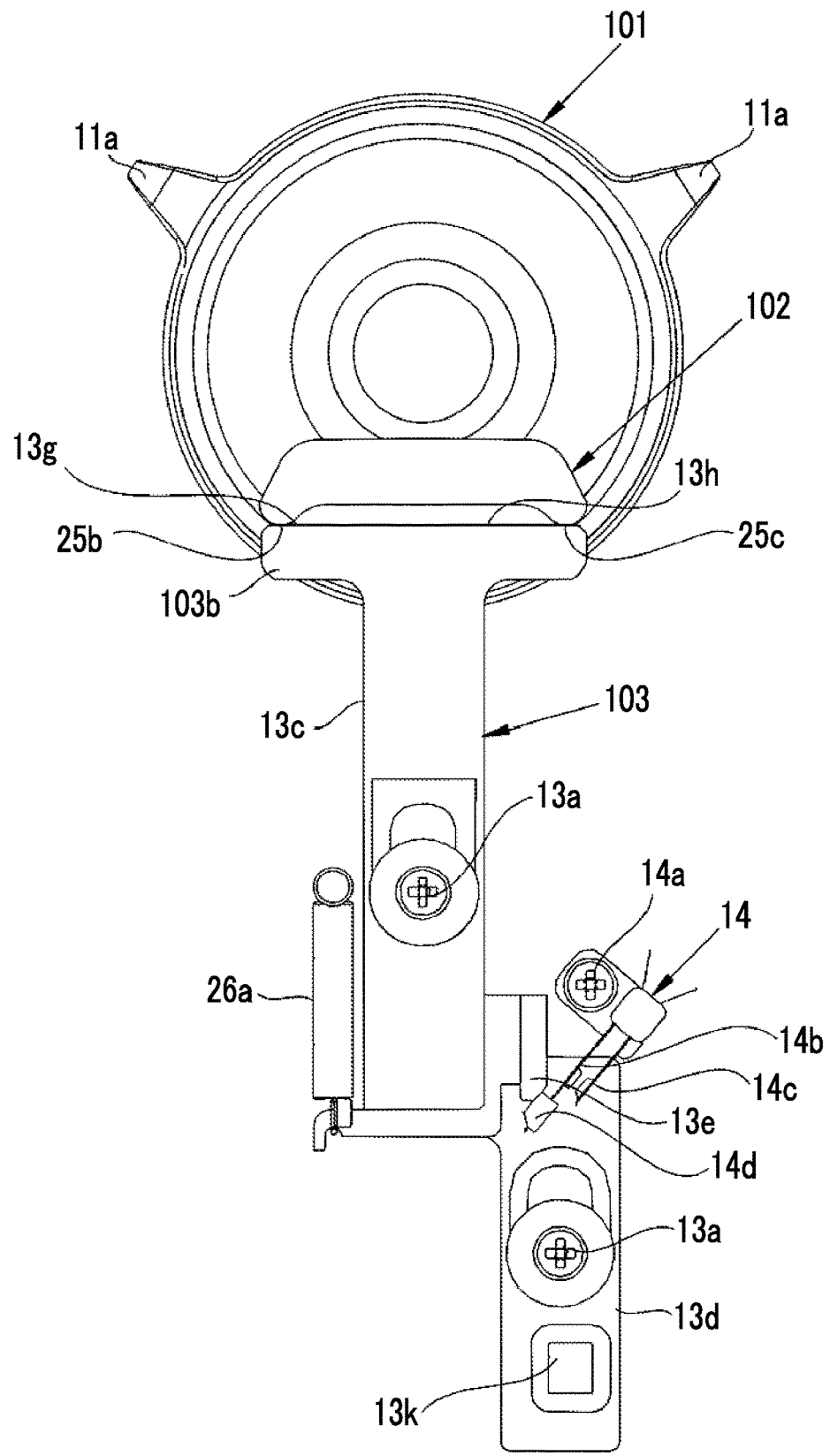
FIG. 25 shows a second embodiment in which the swing lever directly swings by the operation of the operation dial, and is a front view showing a state in which the reception member is in a neutral position.
Figure 26:
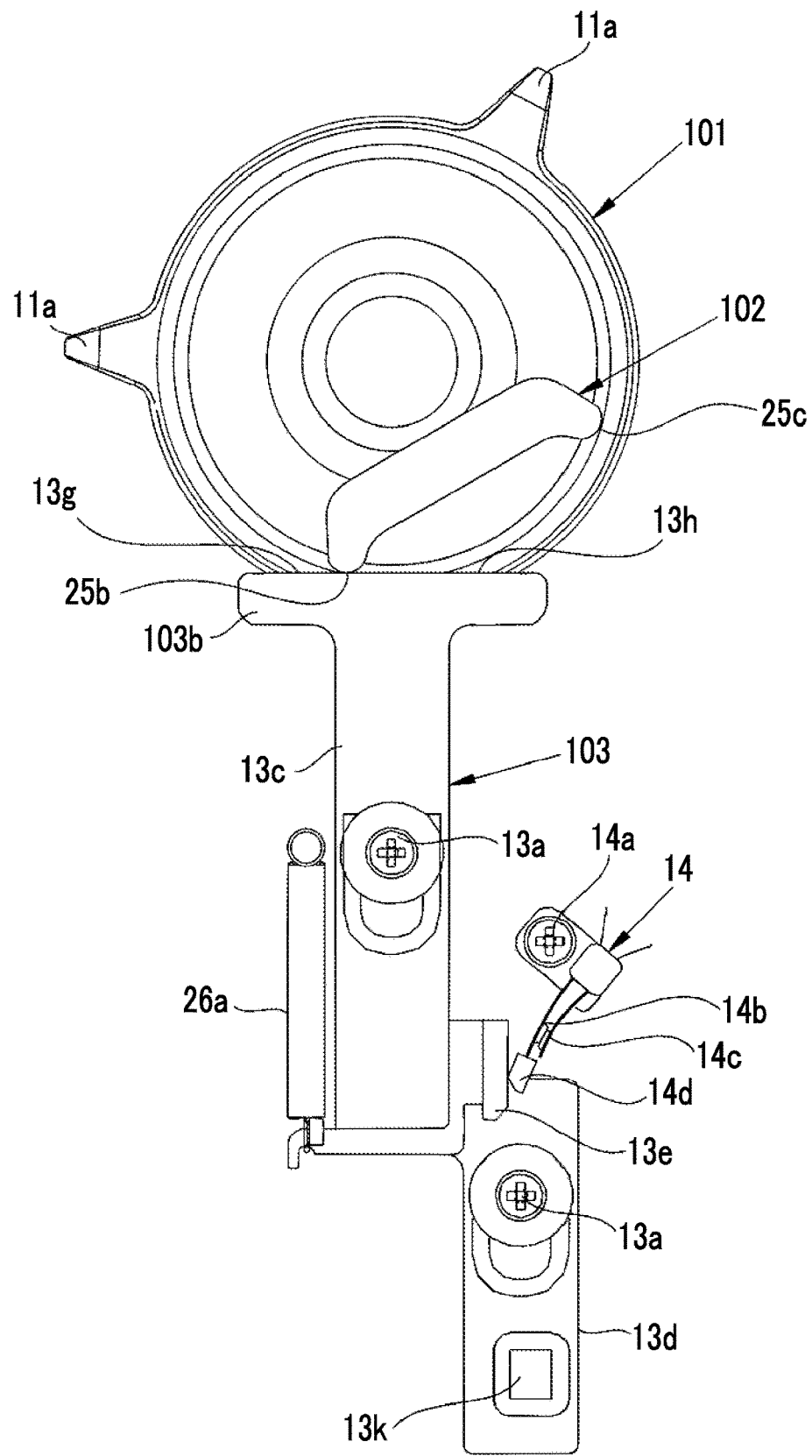
FIG. 26 is a front view showing a state in which the reception member is in a pushed position.

Although it has been described in the first embodiment that the rotation operation of the operation dial 11 is transmitted to the reception member 13 by the interlocking mechanism 12, a swing lever 102 may be provided at the operation dial 101, and the swing lever 102 may directly swing by the rotation operation of the operation dial 101, as in a second embodiment shown in FIGS. 25 and 26. In this case, a reception member 103 moves in the vertical direction due to the swing of the swing lever 102 similarly to the embodiment. Due to the movement, the reception member 103 is displaced between the neutral position shown in FIG. 25 and the pushed position shown in FIG. 26.

The reception member 103 has the same configuration as that of the first embodiment except for that an attachment angle between a reception portion 103b and a slider main body 13c is changed by 90 degrees from the reception portion 13b of the first embodiment, and the same components as those of the first embodiment will be assigned the same references. In the second embodiment, it is possible to unlock the anti-vibration device 45 and turn on the switch main body 14 due to the swing operation of the operation dial 101.

Although it has been described in the embodiments that the finger gripping portions 11a protrude so as to be inclined upwards, the finger gripping portions 11a may protrude so as to be inclined downwards. In this case, the finger gripping portions 11a may be rotated by the thumbs of both hands. The pair of finger gripping portions 11a may horizontally protrude so as to be inclined upwards and so as to be inclined downwards. In this case, it is possible to operate the operation dial with the thumbs other than the middle fingers or the index fingers, and operability is improved.

Although it has been described in the embodiments that the disk-shaped operation dials 11 and 101 are used as the operation members, the finger gripping portions 11a may protrude. The shape of the operation member is not limited to the disk shape, and operation members having various shapes may be used. Although it has been described in the embodiments that a mechanical switch having a contact portion is used as the switch main body 14, a switch opened or closed by an optical sensor or a magnetic sensor may be used. Although it has been described that the operation dial 11 or 101 is attached to the focus adjusting shaft, another shaft may be used as long as a shaft is disposed in the central portion of the binocle 30. The central portion of the binocle 30 includes a surrounding area including the center in addition to the center of the binocle 30. In short, in a case where the binocle 30 is gripped with both hands, the fingers of both hands may be positioned so as to reach the finger gripping portions 11a.

Although it has been described in the embodiment that the anti-vibration regulating lever 15 is used as the anti-vibration regulating member, an anti-vibration regulating member capable of regulating the anti-vibration may be used, and an anti-vibration regulating member such as a slide type in addition to the swing type may be used. Although it has been described that the anti-vibration regulating lever 15 swings due to the engagement of the engagement hole 13k formed in the reception member 13 with the engagement pin 15a provided at the anti-vibration regulating lever 15, the engagement pin may be provided at the reception member 13, and the engagement hole may be formed in the anti-vibration regulating lever 15.

Although it has been described in the embodiment that the operation switch of the present invention is used as the power switch 10 of the anti-vibration device 45, various operation switches may be used.

The anti-vibration device 45 is not limited to the embodiment, and anti-vibration devices using various methods may be used. Although it has been described in the anti-vibration device 45 that the first reflective member 60 is inclined at an angle of 45° with respect to the first optical axis 64a of the objective optical system, and the second optical axis 64b is deflected at an angle of 90° with respect to the first optical axis 64a, an angle formed by the first optical axis 64a and the second optical axis 64b may be smaller or greater than 90°. Further, in a case where the first reflective member 60 and the second reflective member 62 are integrally rotated, the second optical axis 64b is used as a rotational axis thereof, but is not limited to this. For example, the second optical axis may be freely selected if the axis is an axis that passes through the intersection between the first optical axis 64a and the reflective surface of the first reflective member 60 and is included in a plane formed by the first optical axis 64a and the second optical axis 64b.

Although it has been described in the embodiment that the first reflective members 60 are fixed to the barrels 59 and the second reflective member 62 is fixed to and held by the holding plate 61 so as to be rotatable, the second reflective members 62 may be fixed to the barrels 59, and the first reflective members may be held through the holding plate so as to be rotatable.

In the above-mentioned embodiment, a surface reflection mirror was used as the reflective member, but a prism of which the rear surface is reflective may be used as the reflective member. Furthermore, in the description of each embodiment, in order to show a positional relationship between a plurality of optical axes, a certain term such as a right angle or parallelism is used as a specific numerical angle such as 45° or 90°. However, those include tolerances according to accuracies required in an optical system.

EXPLANATION OF REFERENCES

10: power switch (operation switch)
11: operation dial (operation member)
11a: finger gripping portion
11b: attachment tube
11c: outer tube
11d: disk portion
11e: locking hole
12: interlocking mechanism
13: reception member
13a: attachment screw
13b: reception portion
13c, 13d: slider main body
13e: stepped portion
13f: spring locking portion
13g: first reception surface
13h: second reception surface
13k: engagement hole (first engagement portion)
14: switch main body
14a: attachment screw
14b: first switch portion
14c: second switch portion
14d: engagement portion
15: anti-vibration regulating lever (anti-vibration regulating member)
15a: engagement pin (second engagement portion)
15b: attachment shaft
15c: spring locking portion
15d: first regulating pin (first regulating member)
15e: second regulating pin (second regulating member)
16: focus adjusting shaft
16a: male screw portion
17: attachment shaft portion 18: movement bracket
19: torsion coil spring (urging member)
21: intermediate lever
21a: one end portion
21b: other end portion
21c: engagement pin
22: intermediate lever holding member
24: holding bracket
25: swing lever
25a: attachment shaft
25b: first abutment portion
25c: second abutment portion
25d: engagement hole
26a: first coil spring
26b: second coil spring
30: binocle
31: main body portion
31a: front surface
32L: left objective opening
32R: right objective opening
33L: left eyepiece portion
33R: right eyepiece portion
35L: left objective optical system
35R: right objective optical system
36L: left ocular optical system
36R: right ocular optical system
37L: left telephoto optical system
37R: right telephoto optical system
39: battery housing
40: focus adjusting knob
42: battery
43: casing
44L: left objective barrel
44R: right objective barrel
45: anti-vibration device
46: control substrate
47L: left erecting optical system
47R: right erecting optical system
48L: left eyepiece barrel
48R: right eyepiece barrel
50: casing main body
51L: left eyepiece casing
51R: right eyepiece casing
52L: left eyepiece opening
52R: right eyepiece opening
53: support member
53a: bearing pin
54: anti-vibration unit
54L: left anti-vibration unit
54R: right anti-vibration unit
55: link mechanism
56: first voice coil motor
57: second voice coil motor
58: drive unit
59: barrel
59a: bearing hole
59b: bearing boss
59c: upper connection boss
59d: lower connection boss
60: first reflective member
61: holding plate
61a: rotation pin
61b: bracket
61c: connecting pin
62: second reflective member
64a: first optical axis
64b: second optical axis
64c: third optical axis
66: first link member
66a: attachment portion
66b: holding piece
66c: first engagement hole
66d: guide surface
67: second link member
67a: attachment portion
67b: second engagement hole
67c: guide surface
69: first bracket
69a: connecting pin
70: second bracket
70a: connecting pin
71: connecting portion
71a: notch
72: third bracket
72a: connection hole
74: link main body
74a: notch
74b: holding portion
75: connecting arm
75a: connecting pin
77: abutment portion
77a: abutment surface
78: urging member
80: first coil
81: first driving magnet
82A, 82B: yoke
83: detection magnet
84: X-axis position sensor
85: second coil
86: second driving magnet
87: yoke
88: detection magnet
89: Z-axis position sensor
89a: detection surface
90: coupling screw
91: anti-vibration control circuit
92: ROM
93: CPU
94: vibration measurement sensor
95, 96: driver
101: operation dial
102: swing lever
103: reception member
103b: reception portion
111: first rotational axis
112: second rotational axis
113: third rotational axis
BL: left-eye optical axis
BR: right-eye optical axis
D: distance between detection magnet and Z-axis position sensor
H: displacement amount
HMAX: movement stroke
V: displacement amount

What is claimed is:

1. An operation switch of a binocle, comprising:
an operation member that is disposed so as to swing between two barrels of the binocle;
finger gripping portions that protrude toward the two barrels from the operation member;
an urging member that urges the operation member to a state in which at least two finger gripping portions have the same tilt angle with respect to the two barrels;

a reception member that is pushed by rotation of the operation member in one direction and rotation of the operation member in the other direction due to a swing operation for the finger gripping portions against the urging of the urging member; and
a switch main body that is opened or closed by the pushing of the reception member.

2. A binocle comprising:
two barrels;
an operation member that is disposed so as to swing between the two barrels;
a plurality of finger gripping portions that protrudes toward the two barrels from the operation member;
an urging member that urges the operation member to a state in which at least two finger gripping portions have the same tilt angle with respect to the two barrels;
a reception member that is pushed by rotation of the operation member in one direction and rotation of the operation member in the other direction due to a swing operation for the finger gripping portions against the urging of the urging member; and
a switch main body that is opened or closed by the pushing of the reception member.

3. The binocle according to claim 2,
wherein the operation member is rotatably attached to a focus adjusting shaft that rotates for adjusting a focus of the barrel.

4. The binocle according to claim 2,
wherein the reception member has a first reception surface pushed due to rotation displacement of the operation member in the one direction and a second reception surface pushed due to rotation displacement of the operation member in the other direction, and the switch main body enters a closed state from an opened state due to the pushing for the first reception surface and the second reception surface.

5. The binocle according to claim 4, further comprising:
a swing lever that is disposed between the operation member and the reception member,
wherein the swing lever engages with the operation member and swings, and includes a first abutment portion that pushes the first reception surface due to the rotation displacement of the operation member in the one direction and a second abutment portion that pushes the second reception surface due to the rotation displacement of the operation member in the other direction.

6. The binocle according to claim 5, further comprising:
an intermediate lever that is disposed between the operation member and the swing lever,
wherein one end of the intermediate lever is held by the operation member, and the other end engages with the swing lever.

7. The binocle according to claim 2, further comprising:
an anti-vibration device that corrects image blurring of an optical image by displacing at least a part of optical members within the barrel; and
an anti-vibration regulating member that is displaced between an anti-vibration regulating position in which movement of the anti-vibration member is regulated by coming in contact with an anti-vibration member of the anti-vibration device and an anti-vibration position in which the movement of the anti-vibration member is allowed by being separated from the anti-vibration member,
wherein a position of the anti-vibration regulating member is switched between a state of the anti-vibration regulating position and a state of the anti-vibration position by being interlocked with the opening or closing of the switch main body, and anti-vibration control is performed.

8. The binocle according to claim 7,
wherein the reception member has a first engagement portion,
the anti-vibration regulating member has a second engagement portion that engages with the first engagement portion, and
the anti-vibration regulating member is positioned in the anti-vibration regulating position in a neutral state in which the reception member opens the switch main body and the anti-vibration regulating member is positioned in the anti-vibration position in a pushed state in which the reception member closes the switch main body due to the engagement of the first engagement portion with the second engagement portion.

9. The binocle according to claim 8,
wherein the anti-vibration member has a first link member that corrects image blurring in a yaw direction and a second link member that corrects image blurring in a pitch direction, and
the anti-vibration regulating member has a first regulating member that regulates movement of the first link member by being engaged with a first engagement hole of the first link member in the state of the anti-vibration position, and a second regulating member that regulates movement of the second link member by being engaged with a second engagement hole of the second link member in the state of the anti-vibration position.

10. The binocle according to claim 9,
wherein the anti-vibration device includes
a first reflective member that is disposed to be inclined with respect to first optical axes, and forms second optical axes by deflecting the first optical axes,
a second reflective member that is disposed to be inclined with respect to the second optical axes, and forms third optical axes parallel to the first optical axes by deflecting the second optical axes, and
holding members that hold the first reflective member and the second reflective member, and are disposed so as to be rotatable around first rotational axes which are present on a plane including the first optical axes and the second optical axes and cross the first optical axes or the third optical axes, the holding members fixedly holding one reflective member of the first reflective member and the second reflective member and rotatably holding the other reflective member around second rotational axes perpendicular to the plane including the first optical axes and the second optical axes,
wherein the first link member rotates a pair of the holding members around the first rotational axes in a state in which the first optical axes are held in parallel, and
the second link member is attached to the first link member so as to be rotatable around the third rotational axes parallel to the second rotational axes, and rotates the other reflective member of the first reflective member and the second reflective member around the second rotational axes.

11. The binocle according to claim 10, further comprising:
a first voice coil motor that moves the first link member in a first direction which is an arrangement direction of the holding members; and a second voice coil motor that rotates the second link member around the third rotational axes by moving the second link member in a second direction perpendicular to the first direction.

* * * * *